United States Patent
Chen et al.

(10) Patent No.: US 7,203,372 B1
(45) Date of Patent: Apr. 10, 2007

(54) EXTENSION OF TWO-DIMENSIONAL VARIABLE LENGTH CODING FOR IMAGE COMPRESSION

(75) Inventors: Wen-hsiung Chen, Sunnyvale, CA (US); Fang Wu, San Jose, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 858 days.

(21) Appl. No.: 10/440,595

(22) Filed: May 19, 2003

Related U.S. Application Data

(63) Continuation-in-part of application No. 10/342,537, filed on Jan. 15, 2003.

(51) Int. Cl.
*G06K 9/36* (2006.01)

(52) U.S. Cl. .................................................... 382/244

(58) Field of Classification Search ........ 382/244–247; 341/65, 67; 358/426.01, 426.16
See application file for complete search history.

(56) References Cited

U.S. PATENT DOCUMENTS 4,698,672 A    10/1987    Chen et al. ................. 358/136

(Continued)

FOREIGN PATENT DOCUMENTS

EP    0 266 049 A2    5/1988

(Continued)

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Vikkram Bali
(74) *Attorney, Agent, or Firm*—Dov Rosenfeld; Inventek

(57) ABSTRACT

A method and an apparatus to encode a series of quantized coefficients of a transform of a block of image data. The transform is such that 0 is the most likely coefficient amplitude and 1 is the next most likely coefficient amplitude. The method includes forming symbols (called events) from the series of quantized transform coefficients. An event is a run of none or more zero-valued coefficients followed by a run of one of a predefined set of sequences, each sequence in the set being either a single coefficient of amplitude greater than one, or a sequence of 1's and 0's starting with a coefficient of amplitude 1. The method includes forming a codeword for each formed event. Relatively short codewords are formed to represent events that are relatively more likely to occur, and relatively long codewords are formed to represent events that are relatively less likely to occur. In one implementation, each event is a run of none or more zero-valued coefficients followed by one of a predefined set of sequences, each sequence in the set being either a single coefficient of amplitude greater than one, or a sequence of 1's and 0's starting with a coefficient of amplitude 1. In another implementation, an event is a run of none or more zero-valued coefficients followed by a run of one or more non-zero-amplitude coefficients. In a variation, the events include runs of none or more zero-valued coefficients followed by a subset of all possible runlengths of non-zero-amplitude coefficients. In one implementation, the subset includes no runs of length 2 or more of coefficients of amplitude 3 or more.

53 Claims, 8 Drawing Sheets

U.S. PATENT DOCUMENTS

| | | | |
|---|---|---|---|
| 4,706,265 A | 11/1987 | Furukawa | 375/122 |
| 4,813,056 A | 3/1989 | Fedele | 375/27 |
| 4,845,560 A | 7/1989 | Kondo et al. | 358/133 |
| 4,858,017 A | 8/1989 | Torbey | 358/426 |
| 4,920,426 A | 4/1990 | Hatori et al. | 358/433 |
| 4,922,510 A | 5/1990 | Brusewitz | 375/122 |
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,751,232 A | 5/1998 | Inoue et al. | 341/63 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,805,914 A * | 9/1998 | Wise et al. | 382/232 |
| 5,809,173 A | 9/1998 | Liu et al. | 382/233 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,903,313 A | 5/1999 | Tucker et al. | 348/416 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,292,589 B1 * | 9/2001 | Chow et al. | 382/239 |
| 6,304,607 B1 | 10/2001 | Talluri et al. | 375/240.27 |
| 6,330,666 B1 * | 12/2001 | Wise et al. | 712/300 |
| 6,339,386 B1 | 1/2002 | Cho | 341/67 |
| 6,366,614 B1 | 4/2002 | Pian et al. | 375/240.02 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,925,126 B2 | 8/2005 | Lan et al. | 375/240.25 |
| 6,959,116 B2 * | 10/2005 | Sezer et al. | 382/251 |

FOREIGN PATENT DOCUMENTS

| | | |
|---|---|---|
| JP | 406189286 A | 7/1994 |
| WO | WO 93/18616 | 9/1993 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

Max Luttrell, Jiangtao Wen, Henry Yao, and John Villasen: "Robust Low Bit Rate Wireless Video Communications," Final Report, Project 97-193, University http://www.ucop.edu/research/micro/97_98/97_193.pdf.

P.N. Tudor, "MPEG-2 Video Compression", IEEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"Chapter 8 Image Standards: MPEG-1, MPEG-2, and MPEG-4", hmhang/CommLab, EE, NCTU, pp. 1-46, Sep. 13, 1999.

"Chapter 10 H.261/263 and MPEG-1/2/4 Video Coding", hmhang/CommLab, EE, NCTU, pp. 1-42, Dec. 2000.

"Variable Length Coding", Lecture by J.B. Ra, pp. 27-51.

"MPEG-1 Video Codec", pp. 1-8, available on http://www.cmlab.csie.ntu.edu.tw/cml/dsp/training/coding/mpeg1/.

M. Kangas, "MPEG-1 & MPEG-2 Compression", pp. 1-29, Mar. 6, 2002.

Prof. Ming-Ting Sun, Department of E.E., University of Washington, "MPEG-4 Video Standard", pp. 1-7, 2001.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Proceesing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

\* cited by examiner

| Ampl. | Run length of zero amplitudes | | | | | | | | | | | | | |
|---|---|---|---|---|---|---|---|---|---|---|---|---|---|---|
| | 0 | 1 | 2 | 3 | 4 | 5 | 6 | 7 | 8 | ... | 11 | 12 | ... | 27 | ... | 63 |
| 1 | 2(3) | 4 | 5 | 6 | 6 | 7 | 7 | 7 | 8 | ... | 9 | 9 | ... | 20 | ... | 20 |
| 2 | 5 | 7 | 6 | 9 | 11 | 11 | 13 | 13 | 13 | ... | 20 | 20 | | | |
| 3 | 6 | 9 | 11 | 13 | 13 | 14 | 20 | 20 | 20 | ... | | | | | |
| 4 | 8 | 11 | 13 | 14 | 20 | 20 | | | | | | | | | |
| 5 | 9 | 13 | 14 | 20 | | | | | | | | | | | |
| 6 | 9 | 14 | 20 | | | | | | | | | | | | |
| 7 | 11 | 14 | | | | | | | | | | | | | |
| 8 | 13 | 20 | | | | | | | | | | | | | |
| ... | ... | ... | | | | | | | | | | | | | |
| 15 | 14 | 20 | | | | | | | | | | | | | |
| 16 | 20 | | | | | | | | | | | | | | |
| ... | ... | | | | | | | | | | | | | | |
| 128 | 20 | | | | | | | | | | | | | | |

20-bit fixed length codes
Esc (6-bits) + Run (6-bits) + Level (8-bits)

FIG. 3 (Prior Art)

EXTENSION OF TWO-DIMENSIONAL VARIABLE LENGTH CODING FOR IMAGE COMPRESSION

RELATED PATENTS

The present invention is a continuation-in-part of U.S. patent application Ser. No. 10/342,537 filed Jan. 15, 2003 and titled AN EXTENSION OF TWO-DIMENSIONAL VARIABLE LENGTH CODING FOR IMAGE COMPRESSION.

BACKGROUND

The present invention relates to image compression and in particular to variable length coding of quantized transform coefficients.

Variable length coding (VLC) is commonly used in digital video compression. Known transform based compression schemes, for example, divide an image into small blocks, e.g., 8×8 block, transform the blocks (interframe and/or intraframe) using a transform, e.g., the discrete cosine transform (DCT), quantize the resulting coefficients, order the quantized coefficients along a predefined path in the block to form a series of coefficients—sometimes called serializing the coefficients of the block, then statistically encode the series of coefficients using VLC to code the interframe and/or intraframe transform coefficients of each block.

Two-dimensional variable length coding (2D-VLC) is a commonly used VLC technique. In 2D-VLC, each symbol—called an "event"—that is encoded by VLC is not a single coefficient, but combines a run of preceding zero-amplitude coefficients with a non-zero coefficient. That is, each event is a doublet that includes 1) the run length of zero-amplitude coefficients preceding any non-zero coefficient, and 2) the amplitude of that non-zero coefficient. The events are statistically encoded using a variable length code such that the most frequently occurring event is encoded with the shortest codeword, and the least frequently encoded events are encoded with the longest codeword.

2D-VLC is used, for example, in common coding schemes such as ISO/IEC JPEG, MPEG1, MPEG2, and MPEG4 and ITU H.261, H.262, and H.263. 2D-VLC is currently being considered for use in MPEG4-part10 and H.264.

With the advance of integrated circuit technology, computational power and memory are becoming more available. It is therefore becoming feasible to implement variable length coding schemes that provide for more compression than conventional two-dimensional VLC.

Because of the widespread use of image coding, many patents have been issued on different forms of VLC. U.S. Pat. No. 4,698,672 issued Oct. 6, 1987 to Wen-hsiung Chen, one of the inventors of the present invention, for example described one form of a two-dimensional variable length coding method.

Implementing 2D-VLC typically includes modifying the method, for example to reduce the complexity of a hardware implementation. According to one modification, only a subset of the events is encoded using a VLC. Each of a set of less frequently occurring events is encoded with a relatively long, fixed-length codeword, and the other, relatively more frequent events are each encoded with a variable length codeword. An escape code at the beginning of the codeword is used to indicate the fixed-length codewords of the relatively infrequent events.

FIG. 1 shows how a table lookup may be used to implement a 2D-VLC scheme. Prior to the table look up, the runlength of zero amplitudes preceding any non-zero amplitude and the non-zero amplitude are determined. The table look up uses a 2D table for those likely events encoded using variable length encoding. The escape code fixed length codes are used for a set of relatively less likely-to-occur combinations.

In typical 2D-VLC implementations, a short end of block (EOB) code indicates the last non-zero coefficient in the block has been encountered, i.e., that the remaining coefficients in the block are all zero.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard. In 3D-VLC, each symbol ("event") is a triplet (LAST, RUN, LEVEL) that includes: LAST, a binary flag that indicates whether or not the current non-zero amplitude-value is the last non-zero coefficient in the block, RUN, the run-length of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero coefficient is the last one is incorporated into the event.

FIG. 2 shows how a table lookup may be used to implement 3D-VLC.

The existence of patents on 2D-VLC and extensions thereof, and the resulting patent disputes has made a search for alternate VLC methods important.

Thus there is a need for an efficient VLC scheme that can be used as a replacement of known 2D-VLC. There further is a need for an efficient VLC scheme that can provide better compression performance than known 2D-VLC techniques.

SUMMARY

Described herein are a method and an apparatus for processing a series of digital signals that each has an amplitude from the amplitude set consisting a first subset of values and a second subset of values. The first subset of values includes the most common amplitude and at least one other amplitude. The processing is to reduce the amount of data used to represent the digital signals and to form codewords such that the more frequently occurring sequences of values signals are represented by relatively short codewords and the less frequently occurring sequences of values are represented by relatively long codewords.

The application of the method is for when the series of digital signals is a series of quantized coefficients of a transform of a block of image data. The transform is such that 0 is the most likely coefficient amplitude and 1 is the next most likely coefficient amplitude. The first subset of values is then of amplitudes 0 and 1, and the second set is of amplitudes of 2 or more.

The method includes forming a codeword events that are a run of none or more signals having the most common amplitude—e.g., a run of 0's—followed by a run of one or more identical sequences of a predefined set of sequences. Each sequence in the predefined set of sequences is either a single signal having an amplitude from the second subset of amplitudes—e.g., an amplitude of 2 or more—or a sequence of one or more signals each having amplitude from the first subset of amplitudes, starting with an amplitude other than the most common amplitude, e.g., a sequence of coefficients having a sequence of 0's and 1's as amplitudes starting with a 1. The forming of codewords is such that relatively short codewords are formed to represent events that are relatively more likely to occur, and relatively long codewords are formed to represent events that are relatively less likely to occur.

In the application to coding a series of quantized transform coefficients, the method includes forming the symbols (called events) from the series of quantized transform coefficients.

In one implementation, each event is a run of none or more zero-valued coefficients followed by one of a predefined set of sequences, each sequence in the set being either a single coefficient of amplitude greater than one, or a sequence of 1's and 0's starting with a coefficient of amplitude 1. In another implementation, an event is a run of none or more zero-valued coefficients followed by a run of one or more non-zero-amplitude coefficients. In a variation, the events include runs of none or more zero-valued coefficients followed by a subset of all possible runlengths of non-zero-amplitude coefficients. In one implementation, the subset includes no runs of length 2 or more of coefficients of amplitude 3 or more.

Also described herein are a method and an apparatus to decode the encoded bitstream to produce a set of quantized transform coefficients.

Other embodiments, features, aspects, and advantages will be apparent from the description below.

BRIEF DESCRIPTION OF THE DRAWINGS

FIG. 3 shows a 2D-VLC table that indicates the length of each codeword for a common 2-D VLC method used for the H.261 standard.

DETAILED DESCRIPTION

Conventional Two-Dimensional Variable Length Coding

Figure 1:
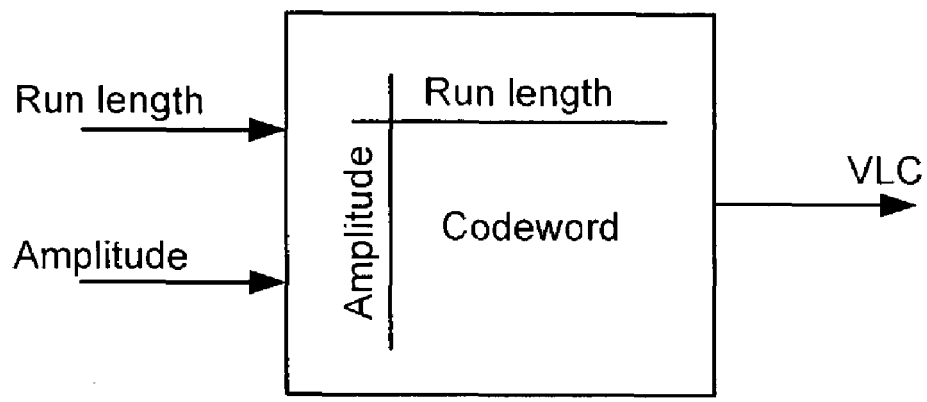
FIG. 1 shows how a prior art 2-D VLC method may be implemented by a table look-up.
Figure 2:
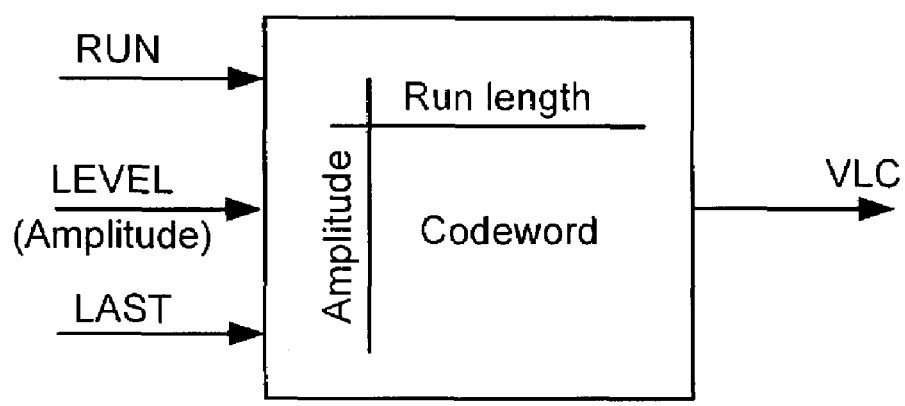
FIG. 2 shows how a common prior art variation of 2-D VLC called 3D-VLC may be implemented by a table look-up.

Variable length coding (VLC) of a series of digital values, e.g., of a series of coefficients resulting by transforming a two-dimensional block of an image (interframe or intraframe) and quantizing the transform assigning variable length codes, e.g., Huffman codes or arithmetic codes, according to the statistics of the coefficients so that short codewords are assigned to relatively likely events and longer codewords to less likely events. The statistics may be known or assumed a-priori, or collected on-the fly.

In 2D-VLC, the events for which codewords are include both the quantized coefficient amplitude and the run-lengths of the most likely-to-occur coefficients—e.g., zero amplitude coefficients—that precedes any less than most likely-to-occur coefficient—e.g., a non-zero amplitude coefficient when the coefficients are ordered along a specified two-dimensional path, e.g., along a zig-zag path for an 8×8 coefficient block to form a series of coefficients.

In the discussion that follows, it is assumed that 0 amplitude is the most likely-to-occur, e.g., the most frequently encountered amplitude, and that 1 is the next most likely-to-occur—next most common—amplitude. The method however can work for other orders of likelihood, so that the most likely amplitude—the first amplitude—need not be 0, and the next most likely amplitude—the second amplitude—need not be 1. Furthermore, the discussion assumes that the likelihood-of-occurrence is indicated by the frequency of occurrence. Of course, the relative probability of occurrence need not correspond to the actual frequency of occurrence that occurs in any particular transformed image block or collection of transformed image blocks.

The occurrence information of the quantities being tracked may be tabulated in a two-dimensional table as shown in Table 1 below, where $S_{ij}$, i, j=1, 2, ... is the number of coefficients that both have amplitude i and are preceded by j consecutive zero amplitude coefficients.

TABLE 1

Statistics collected for 2D-VLC

| Coeff. Ampl. | Runlength of zero valued coefficients | | | | | | | |
|---|---|---|---|---|---|---|---|---|
| | 0 | 1 | 2 | 3 | 4 | 5 | 6 | ... |
| 1 | $S_{10}$ | $S_{11}$ | $S_{12}$ | $S_{13}$ | $S_{14}$ | $S_{15}$ | $S_{16}$ | ... |
| 2 | $S_{20}$ | $S_{21}$ | $S_{22}$ | $S_{23}$ | $S_{24}$ | $S_{25}$ | $S_{26}$ | ... |
| 3 | $S_{30}$ | $S_{31}$ | $S_{32}$ | $S_{33}$ | $S_{34}$ | $S_{35}$ | $S_{36}$ | ... |
| 4 | $S_{40}$ | $S_{41}$ | $S_{42}$ | $S_{43}$ | $S_{44}$ | $S_{45}$ | $S_{46}$ | ... |
| 5 | $S_{50}$ | $S_{51}$ | $S_{52}$ | $S_{53}$ | $S_{54}$ | $S_{55}$ | $S_{56}$ | ... |
| 6 | $S_{60}$ | $S_{61}$ | $S_{62}$ | $S_{63}$ | $S_{64}$ | $S_{65}$ | $S_{66}$ | ... |
| 7 | $S_{70}$ | $S_{71}$ | $S_{72}$ | $S_{73}$ | $S_{74}$ | $S_{75}$ | $S_{76}$ | ... |
| 8 | $S_{80}$ | $S_{81}$ | $S_{82}$ | $S_{83}$ | $S_{84}$ | $S_{85}$ | $S_{86}$ | ... |
| 9 | $S_{90}$ | $S_{91}$ | $S_{92}$ | $S_{93}$ | $S_{94}$ | $S_{95}$ | $S_{96}$ | ... |
| ... | ... | ... | ... | ... | ... | ... | ... | ... |

In 2D-VLC, the symbol ("event") is assigned a variable length code according to the frequency of occurrence (the number $S_{ij}$) and the particular VLC scheme—e.g., Huffman code or arithmetic code—being used. The most frequently occurring event, i.e., the largest $S_{ij}$—typically $S_{10}$ in transform coding—is assigned the shortest code while least occurred combination ($s_{ij}$) is assigned a code with the highest number of bits. The resulting 2D-VLC may then be represented by Table 2, where $C_{ij}$ is the VLC assigned to the event (i,j): the combination of the coefficient having amplitude i that is preceded by j consecutive zero amplitude coefficients.

TABLE 2

2D-VLC

| Coeff. Ampl. | Runlength of zero valued coefficients | | | | | | | |
|---|---|---|---|---|---|---|---|---|
| | 0 | 1 | 2 | 3 | 4 | 5 | 6 | ... |
| 1 | $C_{10}$ | $C_{11}$ | $C_{12}$ | $C_{13}$ | $C_{14}$ | $C_{15}$ | $C_{16}$ | ... |
| 2 | $C_{20}$ | $C_{21}$ | $C_{22}$ | $C_{23}$ | $C_{24}$ | $C_{25}$ | $C_{26}$ | ... |
| 3 | $C_{30}$ | $C_{31}$ | $C_{32}$ | $C_{33}$ | $C_{34}$ | $C_{35}$ | $C_{36}$ | ... |
| 4 | $C_{40}$ | $C_{41}$ | $C_{42}$ | $C_{43}$ | $C_{44}$ | $C_{45}$ | $C_{46}$ | ... |
| 5 | $C_{50}$ | $C_{51}$ | $C_{52}$ | $C_{53}$ | $C_{54}$ | $C_{55}$ | $C_{56}$ | ... |
| 6 | $C_{60}$ | $C_{61}$ | $C_{62}$ | $C_{63}$ | $C_{64}$ | $C_{65}$ | $C_{66}$ | ... |
| 7 | $C_{70}$ | $C_{71}$ | $C_{72}$ | $C_{73}$ | $C_{74}$ | $C_{75}$ | $C_{76}$ | ... |
| 8 | $C_{80}$ | $C_{81}$ | $C_{82}$ | $C_{83}$ | $C_{84}$ | $C_{85}$ | $C_{86}$ | ... |
| 9 | $C_{90}$ | $C_{91}$ | $C_{92}$ | $C_{93}$ | $C_{94}$ | $C_{95}$ | $C_{96}$ | ... |
| ... | ... | ... | ... | ... | ... | ... | ... | ... |

In practice, the statistics (likelihoods of occurrence of the events) are determined a priori—e.g., by experiments on likely sets of images—to form fixed VLC tables. Adaptive coding also may be used in which the encoding depends on statistics such as histograms collected from actual data.

In a typical transform encoding scheme that uses 2D-VLC, the transform blocks are identified as interframe (with motion compensated or not) or intraframe, and the series of quantized coefficients within each transformed block are coded using the 2D-VLC shown in Table 2 when ordered within the along a two-dimensional path.

In a typical implementation, a sign bit is added to identify whether the non-zero amplitude is positive or negative. Furthermore, some relatively non-frequent combinations are encoded by a fixed length code representing the combination of the runlength of zeros and the amplitude following the runlength. An escape code identifying that a fixed length code is being used also is used at the beginning (or end) of each such fixed length codeword.

The Chen et al. 2D-VLC method of U.S. Pat. No. 4,698,672 selects the variable length codes $C_{ij}$ as follows: each runlength of zeroes followed by an amplitude 1 is encoded by a first type of variable length code for the runlength. The amplitude (1) that follows the runlength of zero amplitudes need not be encoded because any codeword encoded according to the first type of variable length code can be assumed at the decoder to have amplitude 1. Each runlength of zeroes followed by a non-zero amplitude other than 1 is encoded by a second type of variable length code for the runlength followed by a code for the amplitude.

U.S. Pat. No. 4,698,672 also describes the following extension. Suppose the series of signals, e.g., the series of transform coefficients to be encoded take on at least n+3 possible values, e.g., 0, 1, . . . , n, and at least two other values, e.g., n+1, n+2, . . . . The method uses n different types of runlength codes—a first, a second, . . . , an n'th type—to respectively represent runs of none or zeros followed by a 1, a 2, . . . , an n, respectively. The method further uses a different type of runlength code—i.e., different from the first, second, . . . , n'th type—to encode runs of zeros followed by any one of the other values. Amplitude encoding is also to encode the amplitude, i.e., the other value that follows the run of zeroes. When one of the first, second, . . . , n'th type of code is used, the type of runlength code identifies which amplitude follows the run of zeroes. In such a case, there is no need to further amplitude encode the amplitude that follows the 0's.

FIG. 3 shows the length of each codeword for a common 2-D VLC used for the H.261 standard. The MPEG-1 and MPEG-2 2D-VLC tables are similar to that for H.261. Only the 113 most likely-to-occur symbols (runlength, amplitude-level) are represented. MPEG-1 and MPEG-2 use similar tables. In MPEG-1, the non-common events are encoded by 20 bits or 28-bits. The escape symbol is 6 bits, followed by a code for the runlength of zeroes followed by the amplitude level code. The 20-bit escape codewords describe levels in the range [−127, +127] while the 28 bit double escape codewords have a range of [−255, +255]. MPEG-2 increases the span to the full dynamic range of quantized inverse DCT coefficients, [−2047, +2047] and simplifies the escape mechanism with a single representation for such an event. The total length of the MPEG-2 escape codeword is 24 bits (6-bit escape code followed by a 6-bit runlength value and 12-bit amplitude level code).

Extending Two-Dimensional Variable Length Coding

One aspect of the invention extends the 2D-VLC method into a third dimension by not only exploiting the fact that consecutive zero values occur often, but also exploiting the consecutive appearances of non-zero-valued coefficients and of known likely-to-occur combinations, e.g., of zero and non-zero values. The extension described herein, for example, uses the fact that consecutive 0's, consecutive 0's that are followed by consecutive amplitude 1 coefficients, and consecutive 0's that are followed by patterns of 1's and of 0's may be more probable, i.e., may occur more frequently than coefficients of amplitude 2 or higher, especially for interframe coded blocks, e.g., transformed blocks of motion compensated prediction residuals. Note that the third dimension of the extension described herein is different from that of common 3D-VLC in which the so-called third dimension is only a binary indication of whether or not a symbol is includes the last non-zero amplitude in the block.

The VLC method is typically applied to transform coefficients. That is, an image is divided into blocks, e.g., 8×8 blocks and transformed into a set of transform coefficients for the block. The transform coefficients are quantized and the quantized block transform coefficients are ordered by scanning the two-dimensional block along a predetermined path, e.g., a zig-zag path. The ordering forms a series of coefficients for the block. In one embodiment, the statistics of the number of contiguous zero-valued coefficients preceding a run of non-zero amplitudes are collected. The collection process results in a three-dimensional table that can be described as the set of two-dimensional tables Table 3-1, 3-2, 3-3, 3-4, etc, shown below:

TABLE 3-1

Statistics of repeated coefficient patterns ending with runs of 1's

| Run of 1's | Runlength of zero valued coefficients | | | | | |
|---|---|---|---|---|---|---|
| | 0 | 1 | 2 | 3 | 4 | ... |
| 1 | S1-1-0 | S1-1-1 | S1-1-2 | S1-1-3 | S1-1-4 | ... |
| 11 | S1-2-0 | S1-2-1 | S1-2-2 | S1-2-3 | S1-2-4 | ... |
| 111 | S1-3-0 | S1-3-1 | S1-3-2 | S1-3-3 | S1-3-4 | ... |
| ... | ... | ... | ... | ... | ... | ... |

TABLE 3-2

Statistics of repeated coefficient patterns ending with runs of 2's

| Run of 2's | Runlength of zero valued coefficients | | | | | |
|---|---|---|---|---|---|---|
|  | 0 | 1 | 2 | 3 | 4 | ... |
| 2 | S2-1-0 | S2-1-1 | S2-1-2 | S2-1-3 | S2-1-4 | ... |
| 22 | S2-2-0 | S2-2-1 | S2-2-2 | S2-2-3 | S2-2-4 | ... |
| 222 | S2-3-0 | S2-3-1 | S2-3-2 | S2-3-3 | S2-3-4 | ... |
| ... | ... | ... | ... | ... | ... | ... |

TABLE 3-3

Statistics of repeated coefficient patterns ending with runs of 3's

| Run of 3's | Runlength of zero valued coefficients | | | | | |
|---|---|---|---|---|---|---|
|  | 0 | 1 | 2 | 3 | 4 | ... |
| 3 | S3-1-0 | S3-1-1 | S3-1-2 | S3-1-3 | S3-1-4 | ... |
| 33 | S3-2-0 | S3-2-1 | S3-2-2 | S3-2-3 | S3-2-4 | ... |
| 333 | S3-3-0 | S3-3-1 | S3-3-2 | S3-3-3 | S3-3-4 | ... |
| ... | ... | ... | ... | ... | ... | ... |

TABLE 3-4

Statistics of repeated coefficient patterns ending with runs of 4's

| Run of 4's | Runlength of zero valued coefficients | | | | | |
|---|---|---|---|---|---|---|
|  | 0 | 1 | 2 | 3 | 4 | ... |
| 4 | S4-1-0 | S4-1-1 | S4-1-2 | S4-1-3 | S4-1-4 | ... |
| 44 | S4-1-0 | S4-2-1 | S4-2-2 | S4-2-3 | S4-2-4 | ... |
| 444 | S4-3-0 | S4-3-1 | S4-3-2 | S4-3-3 | S4-3-4 | ... |
| ... | ... | ... | ... | ... | ... | ... | where the Si-j-k is the statistic for the "event" of a run of j consecutive coefficients of amplitude i preceded by a run of k consecutive coefficients of amplified 0. If N is the highest value coefficient then there are N 2D tables in the 3D table. An optimum variable length code is then derived for each of the Si-j-k above with the most frequently occurred statistics (usually S1-1-0 in transform coding) being assigned the shortest number of bits and the least occurred statistics being assigned the longest number of bits. The constructed VLC can then be summarized by Table 4:

TABLE 4

Codes for repeated coefficient patterns

| Runs of non-zeroes | Runlength of zero valued coefficients | | | | | |
|---|---|---|---|---|---|---|
|  | 0 | 1 | 2 | 3 | 4 | ... |
| 1 | C1-1-0 | C1-1-1 | C1-1-2 | C1-1-3 | C1-1-4 | ... |
| 11 | C1-2-0 | C1-2-1 | C1-2-2 | C1-2-3 | C1-2-4 | ... |
| 111 | C1-3-0 | C1-3-1 | C1-3-2 | C1-3-3 | C1-3-4 | ... |
| ... | ... | ... | ... | ... | ... | ... |
| 2 | C2-1-0 | C2-1-1 | C2-1-2 | C2-1-3 | C2-1-4 | ... |
| 22 | C2-2-0 | C2-2-1 | C2-2-2 | C2-2-3 | C2-2-4 | ... |
| 222 | C2-3-0 | C2-3-1 | C2-3-2 | C2-3-3 | C2-3-4 | ... |
| ... | ... | ... | ... | ... | ... | ... |
| 3 | C3-1-0 | C3-1-1 | C3-1-2 | C3-1-3 | C3-1-4 | ... |
| 33 | C3-2-0 | C3-2-1 | C3-2-2 | C3-2-3 | C3-2-4 | ... |
| 333 | C3-3-0 | C3-3-1 | C3-3-2 | C3-3-3 | C3-3-4 | ... |
| ... | ... | ... | ... | ... | ... | ... |
| 4 | C4-1-0 | C4-1-1 | C4-1-2 | C4-1-3 | C4-1-4 | ... |

TABLE 4-continued

Codes for repeated coefficient patterns

| Runs of non-zeroes | Runlength of zero valued coefficients | | | | | |
|---|---|---|---|---|---|---|
|  | 0 | 1 | 2 | 3 | 4 | ... |
| 44 | C4-2-0 | C4-2-1 | C4-2-2 | C4-2-3 | C4-2-4 | ... |
| 444 | C4-3-0 | C4-3-1 | C4-3-2 | C4-3-3 | C4-3-4 | ... |
| ... | ... | ... | ... | ... | ... | ... |

In one embodiment the coding table, e.g., Table 4 is fixed determined according to statistics are determined a priori, e.g., by experiments on likely sets of images. In an alternate embodiment, the coding table is changeable according to data collected on the fly, e.g., according to statistics such as histograms collected on the fly, e.g., in the form of tables such as Tables 3-1, 3-2, ... and so forth.

Figure 4:
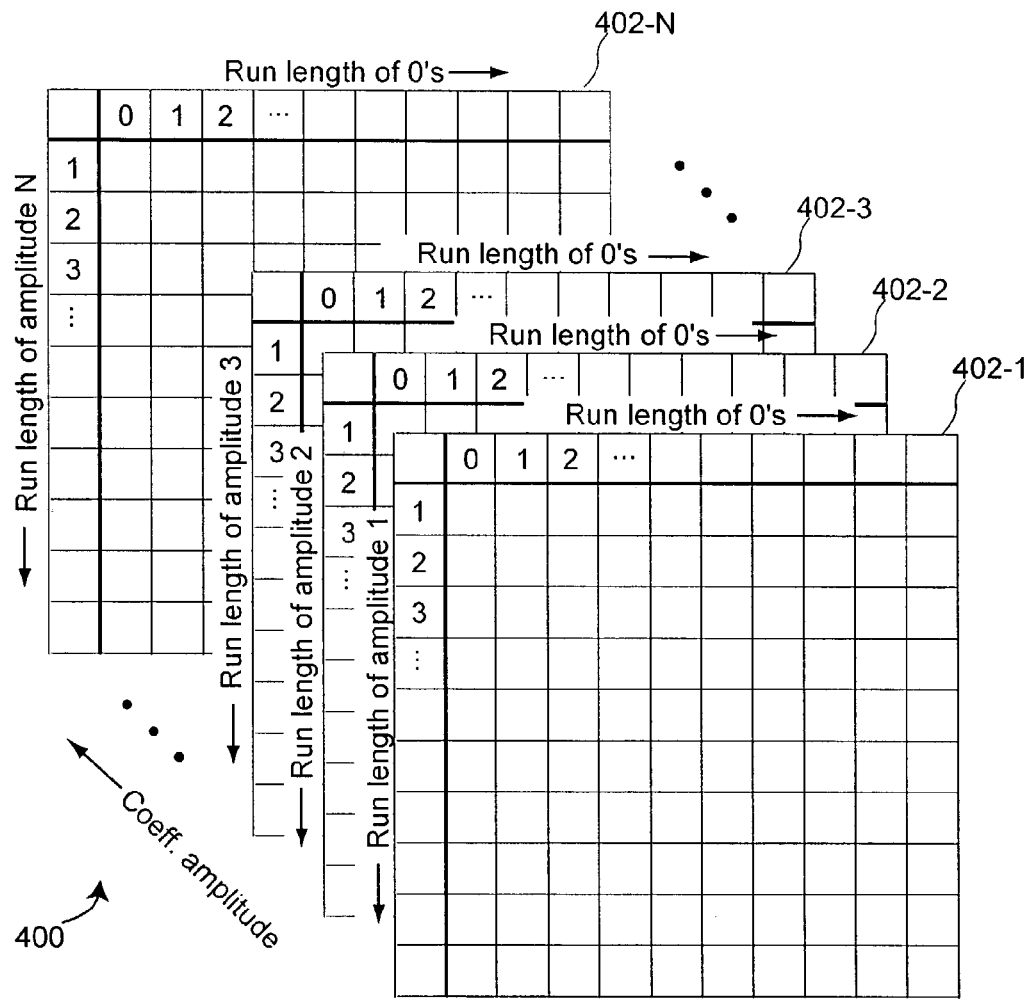
FIG. 4 shows a VLC table that indicates the length of each codeword for one embodiment of a VLC method implemented by a table look-up.

Table 4 can be rewritten as a three-dimensional look-up table 400 shown in FIG. 4. The three dimensional lookup table 400 can be considered a set of two-dimensional tables 402-1, 402-2, ..., 402-N, where N is the largest amplitude that can appear. The tables 402-1 and 402-2 are repeated as Tables 5-1, 5-2, ..., below. The code denoted by Ci-j-k means the code for an event of k consecutive zero amplitudes followed by j consecutive amplitudes of value i, where i can vary from 1 through N.

TABLE 5-1

VLC of repeated coefficient patterns ending with runs of 1's

| Runlength of 1's | Runlength of zero valued coefficients | | | | | |
|---|---|---|---|---|---|---|
|  | 0 | 1 | 2 | 3 | 4 | ... |
| 1 | C1-1-0 | C1-1-1 | C1-1-2 | C1-1-3 | C1-1-4 | ... |
| 2 | C1-2-0 | C1-2-1 | C1-2-2 | C1-2-3 | C1-2-4 | ... |
| 3 | C1-3-0 | C1-3-1 | C1-3-2 | C1-3-3 | C1-3-4 | ... |
| ... | ... | ... | ... | ... | ... | ... |

TABLE 5-2

VLC of repeated coefficient patterns ending with runs of 2's

| Runlength of 2's | Runlength of zero valued coefficients | | | | | |
|---|---|---|---|---|---|---|
|  | 0 | 1 | 2 | 3 | 4 | ... |
| 1 | C2-1-0 | C2-1-1 | C2-1-2 | C2-1-3 | C2-1-4 | ... |
| 2 | C2-2-0 | C2-2-1 | C2-2-2 | C2-2-3 | C2-2-4 | ... |
| 3 | C2-3-0 | C2-3-1 | C2-3-2 | C2-3-3 | C2-3-4 | ... |
| ... | ... | ... | ... | ... | ... | ... |

TABLE 5-N

VLC of repeated coefficient patterns ending with runs of N's

| Runlength of N's | Runlength of zero valued coefficients | | | | | |
|---|---|---|---|---|---|---|
|  | 0 | 1 | 2 | 3 | 4 | ... |
| 1 | CN-1-0 | CN-1-1 | CN-1-2 | CN-1-3 | CN-1-4 | ... |
| 2 | CN-2-0 | CN-2-1 | CN-2-2 | CN-2-3 | CN-2-4 | ... |
| 3 | CN-3-0 | CN-3-1 | CN-3-2 | CN-3-3 | CN-3-4 | ... |
| ... | ... | ... | ... | ... | ... | ... |

Figure 5:
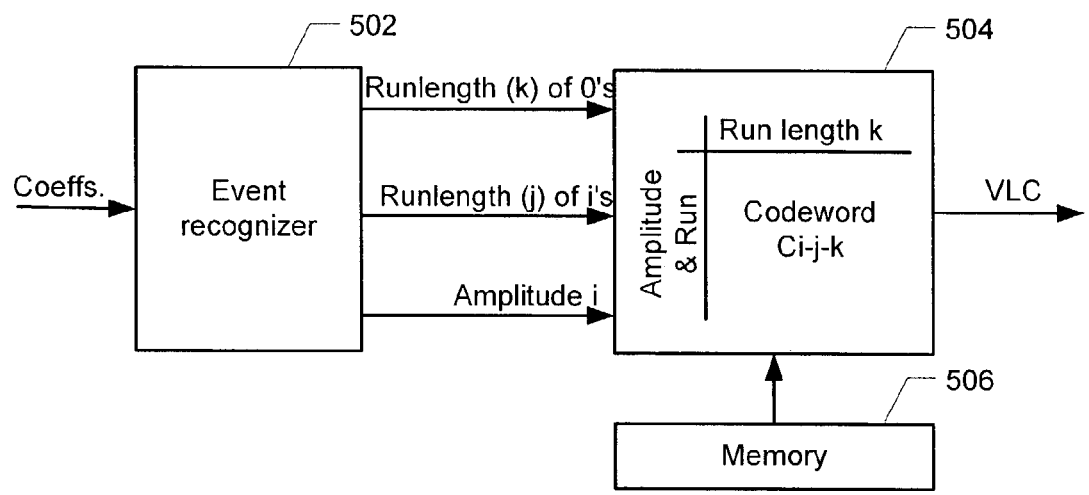
FIG. 5 shows a simplified block diagram of one embodiment of an apparatus to code a series of quantized transform coefficients.

FIG. 5 shows one embodiment of an apparatus for encoding according to the VLC of FIG. 4. One embodiment uses a three-dimensional lookup table such as lookup table 400 (FIG. 4). An event recognizer 502 determines the runlength of preceding zero amplitude and the runlength of the non-zero amplitude following the run of 0's. Thus, a symbol (an "event") of three ordered values is determined for the run of 0's followed by the run of non-zeroes. The three values are the runlength of zeroes, the amplitude of the run following the 0's, and the runlength of the non-zeroes. The output(s) of the event recognizer 502 are input to an encoder 504 that in one embodiment includes a lookup device to look up the three-dimensional lookup table. In one embodiment, the three dimensional lookup is stored in a memory 506 coupled to the lookup device as a set of two-dimensional lookup tables, each 2-D table for a run of a different amplitude. With such an embodiment, the encoder 504 looks up by using the amplitude of non-zeroes as an index to index the appropriate 2D table. This ascertains which 2D table to lookup. That 2D table is then looked up. The actual lookup may include fetching that 2D table from memory. For some of the events, a fixed length codeword with an escape code is formed (see below).

While the embodiment shown in FIG. 5 has the memory 506 that stores the lookup table separate from the lookup device, in another embodiment, the memory is part of the lookup device of encoder 504.

In one alternate embodiment, the three-dimensional lookup table is stored as a set of 2D lookup tables differently, with a different table for each different length of runs of non-zeroes. The first three 2D tables are shown below as Tables 6-1, 6-2, and 6-3, respectively:

TABLE 6-1

VLC of runs of 0's ending with a single amplitude

| Ampl. | Runlength of zero valued coefficients | | | | | |
|---|---|---|---|---|---|---|
|  | 0 | 1 | 2 | 3 | 4 | ... |
| 1 | C1-1-0 | C1-1-1 | C1-1-2 | C1-1-3 | C1-1-4 | ... |
| 2 | C2-1-0 | C2-1-1 | C2-1-2 | C2-1-3 | C2-1-4 | ... |
| 3 | C3-1-0 | C3-1-1 | C3-1-2 | C3-1-3 | C3-1-4 | ... |
| ... | ... | ... | ... | ... | ... | ... |
| N | CN-1-0 | CN-1-1 | CN-1-2 | CN-1-3 | CN-1-4 | ... |

TABLE 6-2

VLC of runs of 0's ending with a run of 2 non-zero amplitudes

| Ampl. of run | Runlength of zero valued coefficients | | | | | |
|---|---|---|---|---|---|---|
|  | 0 | 1 | 2 | 3 | 4 | ... |
| 1 | C1-2-0 | C1-2-1 | C1-2-2 | C1-2-3 | C1-2-4 | ... |
| 2 | C2-2-0 | C2-2-1 | C2-2-2 | C2-2-3 | C2-2-4 | ... |
| 3 | C3-2-0 | C3-2-1 | C3-2-2 | C3-2-3 | C3-2-4 | ... |
| ... | ... | ... | ... | ... | ... | ... |
| N | CN-2-0 | CN-2-1 | CN-2-2 | CN-2-3 | CN-2-4 | ... |

TABLE 6-3

VLC of runs of 0's ending with a run of 3 non-zero amplitudes

| Ampl. of run | Runlength of zero valued coefficients | | | | | |
|---|---|---|---|---|---|---|
|  | 0 | 1 | 2 | 3 | 4 | ... |
| 1 | C1-3-0 | C1-3-1 | C1-3-2 | C1-3-3 | C1-3-4 | ... |
| 2 | C2-3-0 | C2-3-1 | C2-3-2 | C2-3-3 | C2-3-4 | ... |

TABLE 6-3-continued

VLC of runs of 0's ending with a run of 3 non-zero amplitudes

| Ampl. of run | Runlength of zero valued coefficients | | | | | |
|---|---|---|---|---|---|---|
|  | 0 | 1 | 2 | 3 | 4 | ... |
| 3 | C3-3-0 | C3-3-1 | C3-3-2 | C3-3-3 | C3-3-4 | ... |
| ... | ... | ... | ... | ... | ... | ... |
| N | CN-3-0 | CN-3-1 | CN-3-2 | CN-3-3 | CN-3-4 | ... |

Referring back to FIGS. 4 and 5, in one implementation, sign information is added to the codeword resulting from the lookup to indicate the sign of any non-zero amplitudes in the event. See the "Encoding the sign information" section below for more details of about adding sign information.

In practice, including all the possible runs of 0's followed by all the runs of non-zero amplitudes may lead to a table that is too large. For a transform block size of 8×8 coefficients, there could be 63 consecutive amplitudes with the value of k (k=1, 2, 3, . . . , 32) for a size of 8×8 coefficient block, which makes the code table as large as 127,008 entries. Therefore, in one embodiment, the table includes some of the possible events, e.g., only the most likely-to-occur events. For example, long runs of larger amplitudes are much less likely than runs 1's and possibly runs of 2's. Therefore, in one embodiment, the table includes runs of 0's followed by a subset of all possible runlengths of non-zero amplitudes, the subset being of the most likely-to-occur runlengths of non-zero amplitudes. In one implementation, the subset of runlengths excludes runlengths of two or more of amplitudes of 3 or more. In a further refinement, only very short runlengths of amplitude 2 are included. In yet another refinement, only a subset of the runlengths of amplitude 1 are included.

In addition, in one embodiment, some relatively non-frequent events are encoded by a fixed length code representing the combination of the runlength of zeros and the amplitude following the runlength. An escape code identifying that a fixed length code is being used also is used at the beginning of each such fixed length codeword. In one implementation, a single representation is used for the less likely-to-occur events that are encoded by a fixed length codeword. The total length of the escape codeword is 30 bits consisting of a 6-bit escape code followed by a 6-bit runlength value for the run of zeros, 6-bits for the runlength of non-zeroes, and a 12-bit amplitude level code. Other embodiments use a different structure for the escape codeword.

Another embodiment considers events other than just runs of 0's followed by runs of identical non-zero amplitudes. According to such an embodiment, a set is defined of amplitude sequences likely to follow a run of the most likely-to-occur amplitude coefficients—0's. In one embodiment, a first subset of amplitudes is defined, including the most common amplitude and one or more of the next most common amplitudes. The other amplitudes are defined as a second subset of amplitudes. In one implementation, the first subset of amplitudes consists of 0 and 1, the two most likely-to-occur amplitudes, and the second subset consists of those amplitudes larger than 1. Each sequence in the pre-defined set of sequences is either a single coefficient from the second subset of amplitudes or a sequence of at least one coefficient from the first subset of amplitudes, starting with amplitude other than the most likely-to-occur. That is, the set of sequences is either a single amplitude 2, 3, . . . , or a sequence starting with 1 and including only 0's and 1's. Once the set of sequences is defined, in one embodiment, statistics are gathered for the symbols (events) that include a run of 0 amplitudes followed by a run of one of the set of sequences of the predefined set. Table 4 shows one such set of statistics.

TABLE 6

Statistics for coeff ampl. patterns preceded by zero coeff. amplitudes

| Coeff Ampl. Pattern | Runlength of zero valued coefficients | | | | |
|---|---|---|---|---|---|
| | 0 | 1 | 2 | 3 | ... |
| 1 | S1-1-0 | S1-1-1 | S1-1-2 | S1-1-3 | ... |
| 11 | S1-3-0 | S1-3-1 | S1-3-2 | S1-3-3 | ... |
| 111 | S1-3-0 | S1-3-1 | S1-3-2 | S1-3-3 | ... |
| ... | ... | ... | ... | ... | ... |
| 101 | S101-1-0 | S101-1-1 | S101-1-2 | S101-1-3 | ... |
| 1001 | S1001-1-0 | S1001-1-1 | S1001-1-2 | S1001-1-3 | ... |
| 1101 | S1101-1-0 | S1101-1-1 | S1101-1-2 | S1101-1-3 | ... |
| 1011 | S1011-1-0 | S1011-1-1 | S1011-1-2 | S1011-1-3 | ... |
| 10001 | S10001-1-0 | S10001-1-1 | S10001-1-2 | S10001-1-3 | ... |
| 11001 | S11001-1-0 | S11001-1-1 | S11001-1-2 | S11001-1-3 | ... |
| 10101 | S10101-1-0 | S10101-1-1 | S10101-1-2 | S10101-1-3 | ... |
| 10011 | S10011-1-0 | S10011-1-1 | S10011-1-2 | S10011-1-3 | ... |
| 11101 | S11101-1-0 | S11101-1-1 | S11101-1-2 | S11101-1-3 | ... |
| 10111 | S10111-1-0 | S10111-1-1 | S10111-1-2 | S10111-1-3 | ... |
| 101101 | S101-2-0 | S101-2-1 | S101-2-2 | S101-2-3 | ... |
| ... | ... | ... | ... | ... | ... |
| 2 | S2-1-0 | S2-1-1 | S2-1-2 | S2-1-3 | ... |
| 22 | S22-2-0 | S22-2-1 | S22-2-2 | S22-2-3 | ... |
| 222 | S222-3-0 | S222-3-1 | S222-3-2 | S222-3-3 | ... |
| ... | ... | ... | ... | ... | ... |
| 3 | S3-1-0 | S3-1-1 | S3-3-2 | S3-1-3 | ... |
| 33 | S33-2-0 | S33-2-1 | S33-3-2 | S33-3-3 | ... |
| 333 | S333-3-0 | S333-3-1 | S333-3-2 | S333-3-3 | ... |
| ... | ... | ... | ... | ... | ... |
| 4 | S4-1-0 | S4-1-1 | S4-1-2 | S4-1-3 | ... |
| 44 | S44-1-0 | S44-2-1 | S44-2-2 | S44-2-3 | ... |
| 444 | S444-3-0 | S444-3-1 | S444-3-2 | S444-3-3 | ... |
| ... | ... | ... | ... | ... | ... |

The quantity Si-j-k in this case is the statistic for a run of k 0's to be followed by j repeats of the sequence i. Therefore, S101-2-4 is the sequence of coefficient amplitudes 0000101101 which is four 0's followed by two repeats of the sequence 101. A variable length code is then derived for each of the Si-j-k to provide a VLC table as shown in Table 7.

TABLE 7

VLC for coeff ampl. patterns preceded by zeroes

| Coeff Ampl. Pattern | Runlength of zero valued coefficients | | | | |
|---|---|---|---|---|---|
| | 0 | 1 | 2 | 3 | ... |
| 1 | C1-1-0 | C1-1-1 | C1-1-2 | C1-1-3 | ... |
| 11 | C1-3-0 | C1-3-1 | C1-3-2 | C1-3-3 | ... |
| 111 | C1-3-0 | C1-3-1 | C1-3-2 | C1-3-3 | ... |
| ... | ... | ... | ... | ... | ... |
| 101 | C101-1-0 | C101-1-1 | C101-1-2 | C101-1-3 | ... |
| 1001 | C1001-1-0 | C1001-1-1 | C1001-1-2 | C1001-1-3 | ... |
| 1101 | C1101-1-0 | C1101-1-1 | C1101-1-2 | C1101-1-3 | ... |
| 1011 | C1011-1-0 | C1011-1-1 | C1011-1-2 | C1011-1-3 | ... |
| 10001 | C10001-1-0 | C10001-1-1 | C10001-1-2 | C10001-1-3 | ... |
| 11001 | C11001-1-0 | C11001-1-1 | C11001-1-2 | C11001-1-3 | ... |
| 10101 | C10101-1-0 | C10101-1-1 | C10101-1-2 | C10101-1-3 | ... |
| 10011 | C10011-1-0 | C10011-1-1 | C10011-1-2 | C10011-1-3 | ... |
| 11101 | C11101-1-0 | C11101-1-1 | C11101-1-2 | C11101-1-3 | ... |
| 10111 | C10111-1-0 | C10111-1-1 | C10111-1-2 | C10111-1-3 | ... |
| 101101 | C101-2-0 | C101-2-1 | C101-2-2 | C101-2-3 | ... |

TABLE 7-continued

VLC for coeff ampl. patterns preceded by zeroes

| Coeff Ampl. Pattern | Runlength of zero valued coefficients | | | | |
|---|---|---|---|---|---|
| | 0 | 1 | 2 | 3 | ... |
| ... | ... | ... | ... | ... | ... |
| 2 | C2-1-0 | C2-1-1 | C2-1-2 | C2-1-3 | ... |
| 22 | C22-2-0 | C22-2-1 | C22-2-2 | C22-2-3 | ... |
| 222 | C222-3-0 | C222-3-1 | C222-3-2 | C222-3-3 | ... |
| ... | ... | ... | ... | ... | ... |
| 3 | C3-1-0 | C3-1-1 | C3-3-2 | C3-1-3 | ... |
| 33 | C33-2-0 | C33-2-1 | C33-3-2 | C33-3-3 | ... |
| 333 | C333-3-0 | C333-3-1 | C333-3-2 | C333-3-3 | ... |
| ... | ... | ... | ... | ... | ... |
| 4 | C4-1-0 | C4-1-1 | C4-1-2 | C4-1-3 | ... |
| 44 | C44-1-0 | C44-2-1 | C44-2-2 | C44-2-3 | ... |
| 444 | C444-3-0 | C444-3-1 | C444-3-2 | C444-3-3 | ... |
| ... | ... | ... | ... | ... | ... |

Again, one embodiment uses fixed tables, constructed, for example, from a priori statistics. Such statistics may be obtained from experiments performed to determine the set of most likely sequences and the relative likelihood of a run of 0's following one or more repeats of such sequences. In another embodiment, the tables are changeable according to actual data.

To use the coding tables, in one version, after the transform blocks are identified as interframe (including motion compensated interframe) or intraframe mode, the series of quantized transform coefficients within the block are coded according using the above table.

Figure 6A:
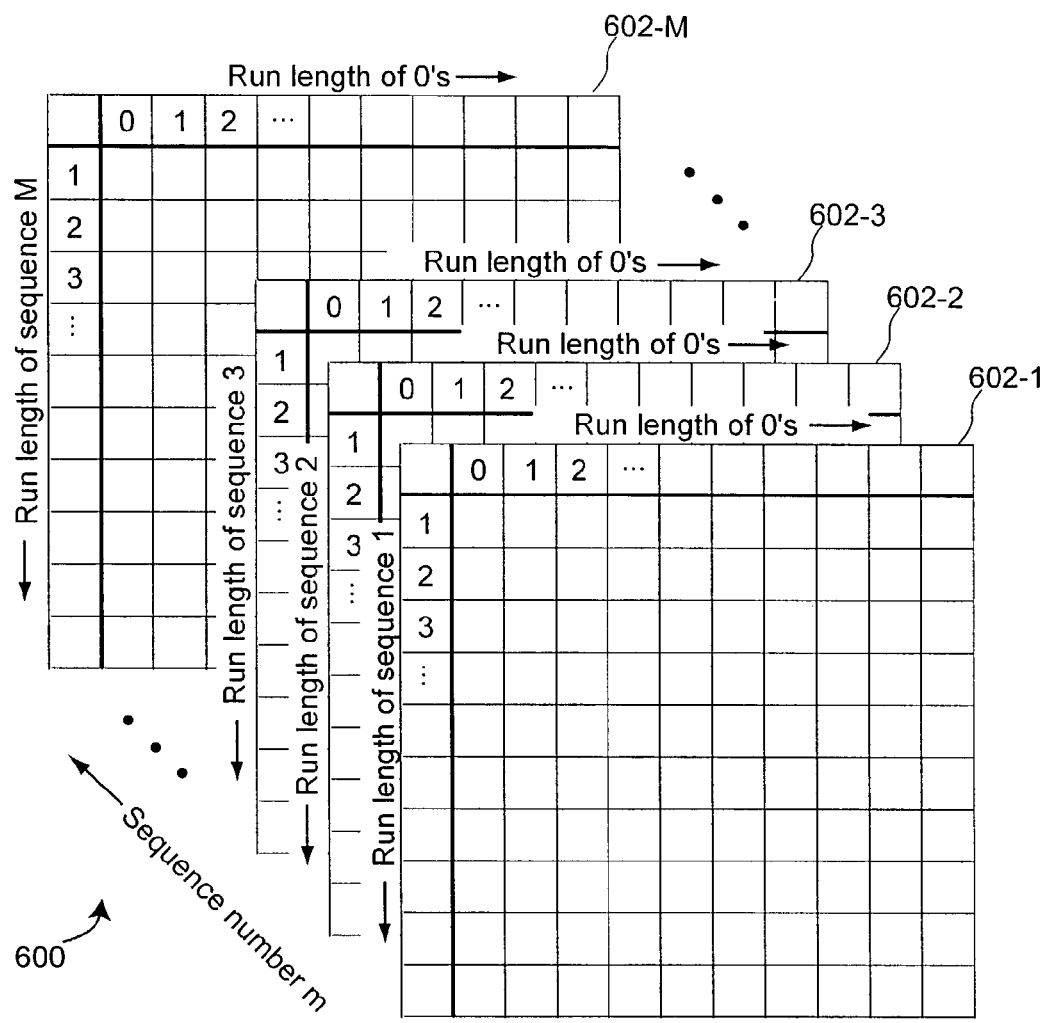
FIG. 6A shows a VLC table that according to one embodiment can be represented by a set of 2D coding tables.

The information in Table 7 can be incorporated in a three-dimensional lookup table 600 as shown in FIG. 6A. Let M denote the number of sequences in the set of most likely sequences. Let i denote an index, i.e., the sequence number of the sequence in the set. The three dimensions of the table are the runlength (k) of preceding zeroes, the index (sequence number m, m=1, . . . , M) of the one or more repeated sequence following the 0's, and the runlength (j) of the sequence following the 0's.

Note that when the predefined set of sequences consists of single amplitudes, the method becomes similar to the embodiment described above wherein an event is a run of zeroes followed by a run of non-zero amplitudes. Furthermore, if one restricts the set of sequences to a single non-zero amplitude, and the symbols to a run of zeroes followed by a single sequence of the set, the method becomes the conventional 2D-VLC method.

One can store the three-dimensional table 600 as a set of M two-dimensional lookup tables 602-1, 602-2, 602-3, . . . , 602-M as shown in FIG. 6A, where each 2D table, say the i'th table is a 2D-VLC table for a sequence of zeroes followed by sequence number i of the set of sequences.

Figure 6B:
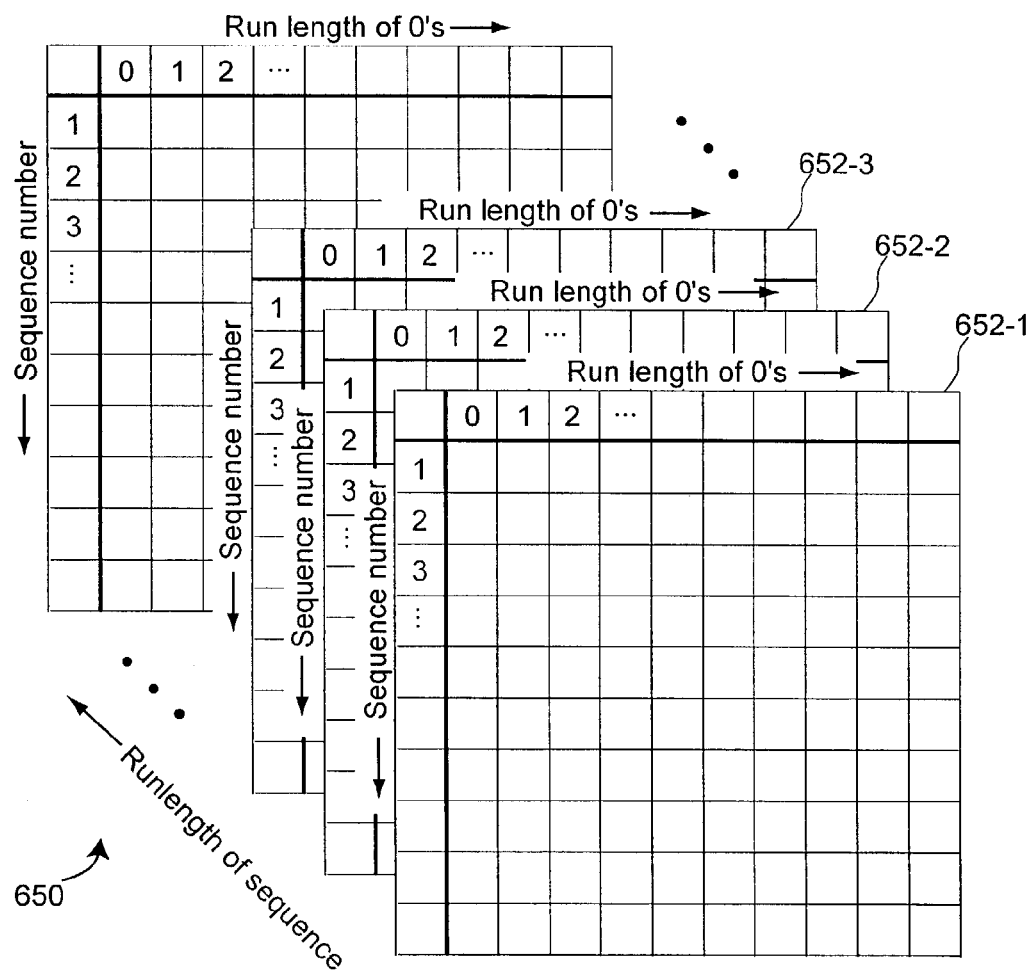
FIG. 6B shows another view of the VLC table of FIG. 6A, showing how the table may be represented by a set of 2D coding tables in a different manner than shown in FIG. 6A.

FIG. 6B is an alternate view of the three-dimensional lookup table that shows how one can store the three-dimensional table 600 (shown in this view as table 650) as a set of two-dimensional lookup tables 652-1, 652-2, 652-3, . . . , where each 2D table, say the j'th table is a 2D-VLC table for a sequence of zeroes followed by a sequence of j instances of each of the sequences.

Figure 7:
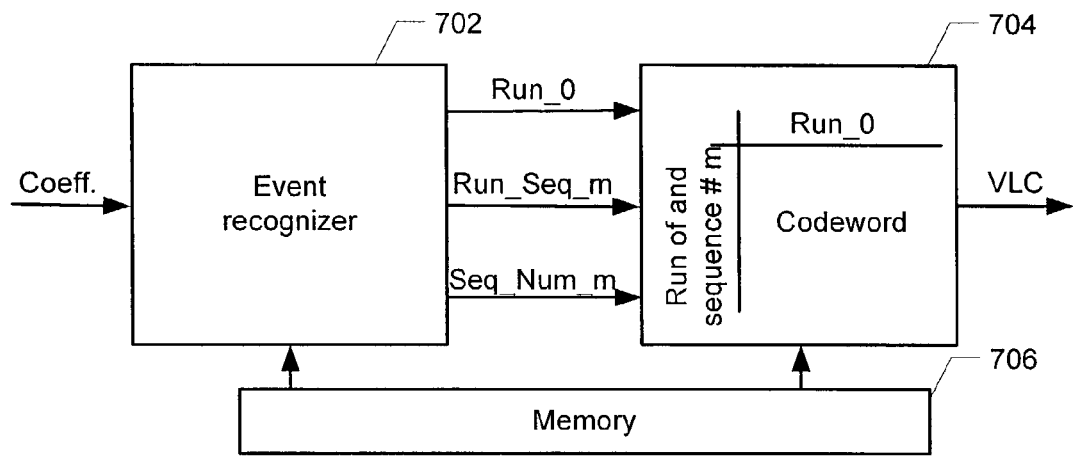
FIG. 7 shows a simplified block diagram of one embodiment of a coding apparatus that encodes using VLC.

FIG. 7 shows an embodiment of an apparatus that implements the 3D-VLC encoding method. When applied to transform encoding, a series of quantized transform coefficients is obtained by transforming a 2D image-block, ordering the transform coefficients along a path in the block, and quantizing the coefficients. The series of coefficients is entered in an event recognizer 702 that in one embodiment includes a sequence pattern recognizer that recognizes which of a predefined set of M sequences follows a run of none or more 0's. The event recognizer further determines the runlength of the run of 0's and, in the case that a sequence of the predefined set is recognized, the run of the recognized sequence. One version of the runlength determining uses counters. In one embodiment, the event recognizer 702 is coupled to a memory 706 for storing the sequences. Sequence pattern recognizers that recognize a sequence of 1's and 0's are well known to those the art. The three outputs of the event recognizer 702 are the number of preceding 0-valued coefficients (Run_0), the recognized sequence number following the 0's (Seq_Num_m), and the runlength of the sequence (Run_Seq_m). The outputs of the event recognizer 702 are input to an encoder 704 that in one embodiment includes a lookup device that is coupled to a memory that stores the 3D table 600. In one embodiment, the same memory 706 is used to store the lookup table as is used to store the sequences.

While the embodiment shown in FIG. 7 has the memory that stores the lookup table separate from the lookup device, in another embodiment, the memory that stores the lookup table is part of the lookup device in encoder 704. The phrase "the lookup device is coupled to a memory" includes the case that the lookup device includes the memory.

In an alternate implementation, each event is a run of consecutive 0's followed by a single instance of one of the sequences. In such an embodiment, different length runs of the next-to-most likely amplitude, e.g., runs of amplitude 1, are included as different sequences in the set of M most likely sequences.

Table 8 below shows one version of a coding table for such an alternate embodiment:

TABLE 8

VLC for coeff. ampl. patterns preceded by zeroes

| Coeff. Ampl. Pattern | Runlength of zero valued coefficients | | | | |
|---|---|---|---|---|---|
| | 0 | 1 | 2 | 3 | ... |
| 1 | $C_1$-0 | $C_1$-1 | $C_1$-2 | $C_1$-3 | ... |
| 11 | $C_{11}$-0 | $C_{11}$-1 | $C_{11}$-2 | $C_{11}$-3 | ... |
| 111 | $C_{111}$-0 | $C_{111}$-1 | $C_{111}$-2 | $C_{111}$-3 | ... |
| ... | ... | ... | ... | ... | ... |
| 101 | $C_{101}$-0 | $C_1$-1 | $C_1$-2 | $C_1$-3 | ... |
| 1001 | $C_{1001}$-0 | $C_{1001}$-1 | $C_{1001}$-2 | $C_{1001}$-3 | ... |
| 1101 | $C_{1101}$-0 | $C_{1101}$-1 | $C_{1101}$-2 | $C_{1101}$-3 | ... |
| 1011 | $C_{1011}$-0 | $C_{1011}$-1 | $C_{1011}$-2 | $C_{1011}$-3 | ... |
| 10001 | $C_{10001}$-0 | $C_{10001}$-1 | $C_{10001}$-2 | $C_{10001}$-3 | ... |
| 11001 | $C_{11001}$-0 | $C_{11001}$-1 | $C_{11001}$-2 | $C_{11001}$-3 | ... |
| 10101 | $C_{10101}$-0 | $C_{10101}$-1 | $C_{10101}$-2 | $C_{10101}$-3 | ... |
| 10011 | $C_{10011}$-0 | $C_{10011}$-1 | $C_{10011}$-2 | $C_{10011}$-3 | ... |
| 11101 | $C_{11101}$-0 | $C_{11101}$-1 | $C_{11101}$-2 | $C_{11101}$-3 | ... |
| 10111 | $C_{10111}$-0 | $C_{10111}$-1 | $C_{10111}$-2 | $C_{10111}$-3 | ... |
| ... | ... | ... | ... | ... | ... |
| 2 | $C_2$-0 | $C_2$-1 | $C_2$-2 | $C_2$-3 | ... |
| 3 | $C_3$-0 | $C_3$-1 | $C_3$-2 | $C_3$-3 | ... |
| 4 | $C_4$-0 | $C_4$-1 | $C_4$-2 | $C_4$-3 | ... |
| ... | ... | ... | ... | ... | ... | where $C_i$-k is the codeword for the event of a run of k consecutive 0's, k=0, 1, 2, . . . , followed by a sequence denoted i of a predefined set of sequences that include a single instance of an amplitude greater than 1 or one of a predefined set of sequences of amplitudes 1 and 0 starting with amplitude 1. Typically, these sequences also end with amplitude 1.

As is known in the art, an end-of-block (EOB) indicator can be used with any of the encoding schemes described above to indicate the end of a block, i.e., that all remaining coefficients in the block have zero amplitude.

Figure 8:
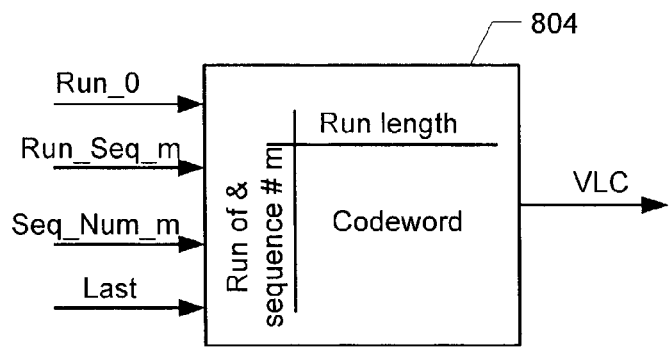
FIG. 8 shows a simplified block diagram of an embodiment of a coding apparatus according to which each event includes information on whether or not the event is the last event in the block.

In alternate versions of each of the encoding schemes, whether or not the end of block is reached can be included as part of the event. In other words, an event now includes an additional "dimension" called "last" that indicated whether or not the event is the last in the block, i.e., the remaining coefficients in the block following the event are all the most common amplitude (zero). FIG. 8, for example, shows a lookup device 804 that looks up the codeword for an event that (run_0, run_seq_m, seq_num_m, last) that includes a run of none or more Encoding the Sign Information Another aspect of the invention is encoding the sign information. Each coefficient may be positive or negative. Thus, the formed codewords for a set of events are encoded with information indicative of the sign of any non-zero amplitudes in the events.

In conventional 2-D VLC, the sign information adds a bit to each codeword. Consider, for example, the following series of 16 coefficients, that may, for example be the quantized coefficients of the transform of a residual 4×4 block on an image:

01−103−10100100000.

For conventional 2-D VLC, using for example, the coding table shown above as Table 2, where $C_{ij}$ is the VLC assigned to the event (i,j) of a run of j consecutive zero amplitude coefficients followed by the nonzero coefficient having amplitude i, the events are:

01, −1, 03, −1, 01, and 001.

In the prior-art, one way of including the sign information is to include a sign bit for each event, the sign bit representing the sign of the non-zero amplitude. Let $s_+$ refer to the sign bit for a positive coefficient and let $s_-$ refer to the code bit for a negative coefficient. Let EOB be the end of block codeword. Suppose also that the sign bit follows the codeword for the event. Then the example series of coefficients would result in the following codewords $C_{11}s_+C_{10}s_-C_{31}s_+C_{10}s_-C_{11}s_+C_{12}s_+$EOB.

Coding the sign information by including a sign bit is applicable to conventional 2D VLC, and for those embodiments that use a coding table of a set of sequences of common amplitudes, to the coding table(s) for amplitudes greater than 1.

In a first embodiment of including the sign information, no sign codeword is included for coefficients of one sign, e.g., positive coefficients, and a sign bit is included for coefficients of the opposite sign, e.g., negative. For the above example series of coefficients, let $s_-$ refer to the code bit for a negative coefficient and again suppose that any sign bit follows the codeword for the event. Then the example series of coefficients would result in the following codewords $C_{11}C_{10}s_-C_{31}C_{10}s_-C_{11}C_{12}$EOB that is shorter than the prior art method illustrated above. In general, if positive and negative sign coefficients are evenly distributed, the method should on average save a half-a bit per event.

According to another aspect of the invention, the sign information is encoded in the form of information related to a change of sign. We call this differential sign encoding.

According to one embodiment of differential sign encoding, the information related to a change of sign is for any change of sign of non-zero-coefficients in the series of coefficients.

Differential sign encoding is applicable to conventional 2D VLC, and for those embodiments that use a coding table of a set of sequences of common amplitudes, or a single instance of an amplitude greater than one, to the entries for amplitudes greater than 1.

According to one embodiment that uses differential sign encoding, an identifiable code is used to indicate whenever the change changes from + to −, and from − to +. One version assumes the first sign is +, while another assumes the first sign is −. Yet another starts with a code that indicates whether the first sign is + or −, and then proceeds to encode change of sign only.

Consider again the example of encoding the following sequence of 16 transform coefficients, e.g., of the transform of a 4×4 block:

01−103−10100100000.

Assume a method according to which the first sign is assumed +. Let $s_c$ be a unique code that indicates change of sign. Then, for differential sign encoding, when combined with conventional 2D-VLC such as shown above using Table 2, for the example series, assuming the change of sign codeword follows $C_{11}s_c C_{10}s_c C_{10}s_c C_{11}C_{12}$EOB.

where EOB is a codeword that indicates the end of block, and where the change of sign codeword precedes the codeword that has the new sign. In an alternate embodiment, the change of sign codeword follows rather than precedes the codeword that has the new sign.

In another embodiment, an indication is included of the first sign. For such an embodiment, the resulting code sequence using Table 2 is:

$s_+ C_{11}s_c C_{10}s_c C_{31}s_c C_{10}s_c C_{11}C_{12}$EOB where $s_+$ and $s_-$ indicate the first coefficient is +ve and a −ve, respectively, EOB is a codeword that indicates the end of block, and where the initial sign and change of sign codewords precede the codeword that has the sign.

In an alternate embodiment that uses a codeword to indicate the first sign, instead of a different change of sign codeword, $s_+$ and $s_-$ are used to indicate a change to a +ve and to a −ve first coefficient, respectively. For such an alternate embodiment, the resulting code sequence is, using Table 2:

$s_+ C_{11}s_- C_{10}s_+ C_{31}s_- C_{10}s_+ C_{11}C_{12}$EOB.

In one embodiment of the present invention, the codewords each represent an event that includes a run of none or more consecutive zero-amplitudes followed by a run of one or more of a sequence of a set of predefined sequences. In one version, the set of predefined sequences consists of a set of single instances of an amplitude greater than one and a predefined set of sequences of amplitudes 0 and 1, starting with amplitude 1. Typically, the amplitude 1 or 0 sequences also end with amplitude 1.

The above-described techniques for indication of sign of each individual event, either by differential sign encoding or otherwise, are most applicable to events that are a run of none or more zero-amplitudes followed by a single instance of an amplitude greater than one. They can also be applied to events that include repetitions of single amplitudes, and events that include one of a predefined set of sequences. The sign would then apply to the whole event.

Other methods are now presented for representing the signs of events that include more than a single amplitude. Each such event may be a run of none or more zero amplitudes followed by one or more identical amplitudes, or a run of none or more zero amplitudes followed by one or more identical sequences of amplitudes 0 and 1.

Consider, for example, an embodiment that uses the coding table shown above as Table 8. With respect to the sequences of amplitudes 0 and 1—also applicable to sequences of repetitions of a single amplitude—, in a first alternate embodiment, a positive coefficient is distinguished from a negative coefficient, e.g., +1 is distinguished from −1 for the coding table of the events that have the common amplitudes of 0 and 1. Thus, for example, Table 8 is replaced with Table 9 shown below of ternary values, 0, +1, and −1, where an event is a run of consecutive 0's followed by a common sequence of 0, +1, and −1, starting with either +1 or −1. Typically, the sequences also end with either +1 or −1.

TABLE 9

VLC for coeff. ampl. patterns preceded by zeroes

| Coeff. Ampl. Pattern | Runlength of zero valued coefficients | | | |
|---|---|---|---|---|
| | 0 | 1 | 2 | ... |
| 1 | $C_1$-0 | $C_1$-1 | $C_1$-2 | ... |
| 11 | $C_{11}$-0 | $C_{11}$-1 | $C_{11}$-2 | ... |
| 1-1 | $C_{1-1}$-0 | $C_{1-1}$-1 | $C_{1-1}$-2 | ... |
| -11 | $C_{-11}$-0 | $C_{-11}$-1 | $C_{-11}$-2 | ... |
| -1-1 | $C_{-1-1}$-0 | $C_{-1-1}$-1 | $C_{-1-1}$-2 | ... |
| 101 | $C_{101}$-0 | $C_{101}$-1 | $C_{101}$-2 | ... |
| 10-1 | $C_{10-1}$-0 | $C_{10-1}$-1 | $C_{10-1}$-2 | ... |
| ... | ... | ... | ... | ... |
| -101 | $C_{-101}$-0 | $C_{-101}$-1 | $C_{-101}$-2 | ... |
| -10-1 | $C_{-10-1}$-0 | $C_{-10-1}$-1 | $C_{-10-1}$-2 | ... |
| 111 | $C_{111}$-0 | $C_{111}$-1 | $C_{111}$-2 | ... |
| ... | ... | ... | ... | ... |
| 11-1 | $C_{11-1}$-0 | $C_{11-1}$-1 | $C_{11-1}$-2 | ... |
| ... | ... | ... | ... | ... |
| 1001 | $C_{1001}$-0 | $C_{1001}$-1 | $C_{1001}$-2 | ... |
| ... | ... | ... | ... | ... |
| 100-1 | $C_{100-1}$-0 | $C_{100-1}$-1 | $C_{100-1}$-2 | ... |
| ... | ... | ... | ... | ... |
| 1101 | $C_{1101}$-0 | $C_{1101}$-1 | $C_{1101}$-2 | ... |
| ... | ... | ... | ... | ... |
| 1011 | $C_{1011}$-0 | $C_{1011}$-1 | $C_{1011}$-2 | ... |
| ... | ... | ... | ... | ... |
| 10001 | $C_{10001}$-0 | $C_{10001}$-1 | $C_{10001}$-2 | ... |
| ... | ... | ... | ... | ... |
| 11001 | $C_{11001}$-0 | $C_{11001}$-1 | $C_{11001}$-2 | ... |
| ... | ... | ... | ... | ... |
| 10101 | $C_{10101}$-0 | $C_{10101}$-1 | $C_{10101}$-2 | ... |
| ... | ... | ... | ... | ... |
| 10011 | $C_{10011}$-0 | $C_{10011}$-1 | $C_{10011}$-2 | ... |
| ... | ... | ... | ... | ... |
| 2 | $C_2$-0 | $C_2$-1 | $C_2$-2 | ... |
| 3 | $C_3$-0 | $C_3$-1 | $C_3$-2 | ... |
| 4 | $C_4$-0 | $C_4$-1 | $C_4$-2 | ... |
| ... | ... | ... | ... | ... |

As an example, consider the example series of 16 coefficients, that may, for example be the quantized coefficients of the transform of a residual 4×4 block on an image:

01−103−1010000000.

Suppose in Table 9 the set of sequences of amplitudes 0 and 1 includes only sequences of up to five amplitudes, starting and ending in amplitude 1. The events are then 01−1, 03, −101, and 001.

Suppose further that for the events that include a single amplitude greater than one, a single sign bit is used. In this embodiment, the sign bit follows any codeword. Let $s_+$ refer to the sign bit for a positive coefficient and let $s_-$ refer to the sign bit for a negative coefficient. Let EOB be the end of block codeword. Then the example series of coefficients would result in the following codewords $C_{1-1}$–$1C_3$–$1s_+C_{-101}$–$0C_1$–2EOB.

In one alternative, for the events that include a coefficient amplitude greater than 1, no sign codeword is included for coefficients of one sign, e.g., positive coefficients, and a sign bit is included for coefficients of the opposite sign, e.g., negative. For the above example series of coefficients, let $s_-$ refer to the code bit for a negative coefficient. Then the example series of coefficients would result in the following codewords $C_{1-1}$–$1C_3$–$1C_{-101}$–$0C_1$–2EOB.

According to yet another alternate embodiment, the encoding of the signs of the coefficients includes encoding the sequence of signs of all the non-zero coefficients to produce a separate sign codeword for all the signs. Only the non-zero coefficients are encoded. Such encoding can be done only according to relative positioning of the non-zero coefficients, and irrespective of the actual position of the non-zero coefficients, e.g., irrespective of the length of the run of zero-amplitude coefficients that precede a non-zero coefficient.

For the example sequence of 16 transform coefficients:
0 1 –1 0 3 –1 0 1 0 0 1 0 0 0 0 0, the signs are
+ – + – + +.

Because in typical transforms of residual images after motion compensation, most coefficients are zero, i.e., fewer non-zero coefficients are more likely than many non-zero coefficients, in one embodiment the coding of the sign sequence is to code 1 for + and 0 for –, preceded by a unique code that indicates the codeword follows. This provides a variable length code. As an example, the variable code word for the above sign sequence would be $c_s$101011, where $c_s$ is the code that indicates the sign codeword follows. In another embodiment, no $c_s$ code is used or needed. The sign sequence may be attached at the end of the EOB.

Decoding

Another aspect of the invention is a method for decoding a bitstream encoded by any of the encoding methods described herein. For example, one aspect is a method to decode a bitstream that is coded by a method that includes forming a codeword for each event that is a run of none or more zero-valued coefficients followed by a run of one of a predefined set of sequences. Each sequence in the predefined set is either a single coefficient of amplitude greater than one, or a sequence of amplitude-1's and 0's starting with a coefficient of amplitude 1. The coding is such that relatively short codewords in the bitstream represent events that are relatively more likely to occur, and relatively long codewords represent events that are relatively less likely to occur. The decoding method includes determining each codeword, determining the event represented by each codeword, and determining the sub-series of coefficients of each determined event until all coefficients in the block are determined. In one version, a codeword representing an end of block is used in the coding to indicate that all remaining coefficients in the block are 0. When the decoding method encounters the codeword representing the end of block, it assigns amplitude 0 to all remaining coefficients.

How to recognize the codewords in the bitstream and how to decode the recognized codewords given a description of the encoding scheme, e.g., a coding table, is known to those in the art. In one embodiment, the codes a selected such that no codeword is the prefix of a longer codeword. The encoding method includes a recognizing a codeword bit-by-bit as more data is of the input bitstream is obtained. One method uses a decoding table. Consider, for example, the code of Table 5. A decoding table is a table that provides the events for all possible codewords. As a codeword is recognized, the event of that codeword, i.e., the sequence of coefficients is formed.

One decoding method uses a lookup table. In such an embodiment, a table is provided containing a plurality of codewords and the events for each codeword. The determining of the event for each recognized codeword includes looking up the table.

Figure 9:
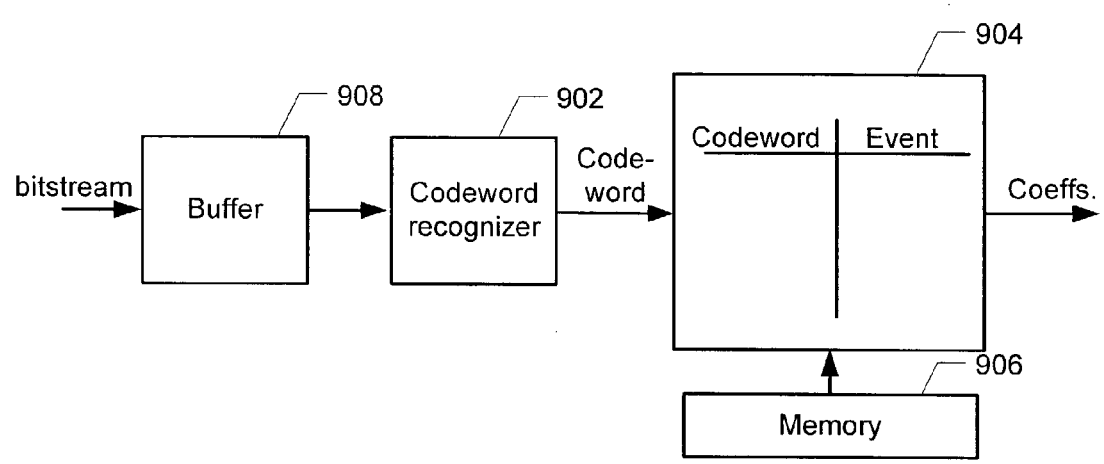
FIG. 9 shows a simplified block diagram of an embodiment of a decoding apparatus.

Another aspect of the invention is an apparatus for decoding a bitstream encoded by any of the novel methods described herein. FIG. 9 shows one embodiment of the apparatus. A codeword recognizer 902 accepts the bits of a bitstream and recognizes a codeword of a set of possible codewords that each represents an event. A decoder 904 is coupled to the codeword recognizer 902 and determines the event for the codeword recognized by the codeword recognizer. In one embodiment, the decoder 904 is a lookup device that looks up a table stored in a memory 906. That table provides the event for at least some of the codewords of the set of codewords. Other codewords may include an escape code, so that decoding is by other than a table lookup. In one embodiment, the bitstream is stored in a buffer 908, and the output of the buffer is coupled to the codeword recognizer.

While in the embodiment shown in FIG. 9, the memory is shown separate from the lookup device, those in the art will understand that in other embodiments, the memory for the table is part of the lookup device, and such other embodiments are included herein.

Another aspect of the invention is a memory (such as memory 506 in FIG. 5 and memory 706 in FIG. 7) that stores a coding data structure that provides the codeword for an event as described any one of the novel coding methods described herein. In one embodiment, the data structure is in the form of one or more tables. For example, one memory embodiment stores a table that provides the codeword for events that are each a run of none or more zero-valued coefficients followed by a run of one of a predefined set of sequences, each sequence in the set being either a single coefficient of amplitude greater than one, or a sequence of 1's and 0's starting with a coefficient of amplitude 1. Relatively short codewords in the table represent events that are relatively more likely to occur, and relatively long codewords represent events that are relatively less likely to occur.

Another aspect of the invention is a memory (such as memory 906 in FIG. 9) that stores a decoding data structure that provides the event for any codeword recognized in a bitstream that of compressed image data. The bitstream is coded by any one of the novel coding methods described herein. In one embodiment, the data structure is in the form of one or more tables. For example, one memory embodiment stores a table that provides events that are each a run of none or more zero-valued coefficients followed by a run of one of a predefined set of sequences, each sequence in the set being either a single coefficient of amplitude greater than one, or a sequence of 1's and 0's starting with a coefficient of amplitude 1.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. Foe example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note also that the term amplitude is irrespective of sign. Therefore, for example, coefficient of values +1 and −1 both have amplitude 1.

While one embodiment described herein includes a memory that stores a coding table (including a 3D table stored in the form of a plurality of 2D tables), other embodiments store the coding information in the form of a data structure other than a table, e.g., a structure that includes a tree. Other data structures also may be used. Similarly, while one embodiment described herein includes a memory that stores a decoding, other embodiments store the decoding information in the form of a data structure other than a table for the decoding.

Note also that the present invention does not depend on the particular type of VLC used, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. A method for encoding a series of digital signals that each have an amplitude from the amplitude set consisting of a first subset of values and a second subset of values, the first subset of values including the most common amplitude and at least one other amplitude, the method to reduce the amount of data used to represent the digital signals and to form codewords such that the more frequently occurring sequences of values of digital signals are represented by relatively short codewords and the less frequently occurring sequences of values of digital signals are represented by relatively long codewords, the method comprising:

forming a codeword for each event of a set of events, each event being a run of none of more signals having the most common amplitude followed by a run of one or more identical sequences of a predefined set of sequences, each sequence in the predefined set of sequences being either a single signal having an amplitude from the second subset of amplitudes or a sequence of one or more signals each having amplitude from the first subset of amplitudes, starting with an amplitude other than the most common amplitude, providing with the codewords information indicative of the sign of any amplitude other than the most common amplitude in the events, such that relatively short codewords are formed to represent events that are relatively more likely to occur, and relatively long codewords are formed to represent events that are relatively less likely to occur.

2. A method as recited in claim 1, wherein the providing of information indicative of the sign includes:

including sign information of a first kind for those events are each a run of none of more signals having the most common amplitude followed by a single signal having an amplitude from the second subset of amplitudes, the sign information of the first kind to indicate for an event the sign of the amplitude from the second subset of amplitudes, and including sign information of a second kind for those events that are each a run of none of more signals having the most common amplitude followed by a run of one or more identical sequences of one or more signals each having amplitude from the first subset of amplitudes, starting with an amplitude other than the most common amplitude.

3. A method as recited in claim 2, wherein the sign information of the first kind is in the form a sign bit for the codewords to indicate the sign of the amplitude from the second subset of amplitudes.

4. A method as recited in claim 2, wherein the sign information of the first kind includes information related to change of sign.

5. A method as recited in claim 4, wherein in the sign information of the first kind includes, a predefined initial sign is assumed for the first signal having amplitude other than the most common amplitude.

6. A method as recited in claim 4, wherein in the sign information of the first kind includes, an indication is included of the sign of the first signal having amplitude other than the most common amplitude.

7. A method as recited in claim 2, wherein the most common value is zero, and wherein positive signal values are distinguished from negative signal values in events that include a run of zero or more zero-amplitude signals followed by a run of one or more identical sequences of one or more signals each having amplitude from the first subset of amplitudes, starting with non-zero amplitude such that sign information of the second kind is applicable to events in which positive signal values are distinguished from negative signal values, such that the forming of codewords is for events in which positive signal values are distinguished from negative signal values, and such that the sign information of the second kind is included in the formed codewords.

8. A method as recited in claim 7, wherein the indication of the sign includes an encoding of the sequence of signs of all the non-zero signals to produce a separate sign codeword for all the signs.

9. A method as recited in claim 1, wherein a table is provided for storing a plurality of codewords for a set of events, the table organized such that the more likely-to-occur events have shorter codewords than the less likely-to-occur events, and wherein the step of forming a codeword for each formed event includes looking up the table.

10. A method as recited in claim 1,
wherein the series of digital signals is a series of quantized coefficients of a transformed block of image data, the transform such that the most common amplitude is 0,
wherein the first subset consists of the amplitudes 0 and 1, and
wherein the second subset consists of the non-zero amplitudes that are greater than 1,
such that the predefined set of sequences includes a single amplitude greater than one, or a sequence of amplitudes of 1's and 1's starting with a 1, and
such that each event for which a codeword is formed is a run of none or more 0's followed by a run of either identical sequences of 0's and 1's that start with a 1 or a single amplitude greater than 1.

11. A method as recited in claim 1, wherein the most common value is the amplitude most likely to occur, and wherein the other amplitudes in the second subset of amplitudes are more likely to occur than the amplitudes in the second subset of amplitudes.

12. A method as recited in claim 11, wherein the forming of codewords for each event is fixed based on assumed a priori likelihood of occurrence of the events.

13. A method as recited in claim 1, further comprising:
forming an indication for when all the remaining digital signals in the series have the most common amplitude.

14. A method as recited in claim 1, wherein forming an event further includes indicating whether or not the event is the last for the series such that all the digital signals in the series following the event have the most common amplitude.

15. A method for encoding a series of digital signals that each have an amplitude from the amplitude set that includes the most common amplitude and at least one other amplitude, the method to reduce the amount of data used to represent the digital signals and to form codewords such that the more frequently occurring sequences of values of digital signals are represented by relatively short codewords and the less frequently occurring sequences of values of digital signals are represented by relatively long codewords, the method comprising:
forming a codeword for each event of a set of events, each event being a run of none of more signals having the most common amplitude followed by a signal having an amplitude other than the most common amplitude, and
providing with the codewords information indicative of the sign of any amplitude other than the most common amplitude in the events,
such that relatively short codewords are formed to represent events that are relatively more likely to occur, and relatively long codewords are formed to represent events that are relatively less likely to occur,
wherein the information indicative of the sign includes information related to change of sign.

16. A method as recited in claim 15, wherein the information related to change of sign is for any change of sign of non-zero-values in the series of signals.

17. A method as recited in claim 15, wherein a predefined initial sign is assumed for the first signal having amplitude other than the most common amplitude.

18. A method as recited in claim 15, wherein an indication is included of sign of the first signal having amplitude other than the most common amplitude.

19. A method as recited in claim 15,
wherein the series of digital signals is a series of quantized coefficients of a transformed block of image data, the transform such that the most common amplitude is 0,
such that each event for which a codeword is formed is a run of none or more 0's followed by am amplitude greater than 1.

20. A method for encoding a series of digital signals that each have an amplitude from the amplitude set that includes the most common amplitude and at least one other amplitude, the method to reduce the amount of data used to represent the digital signals and to form codewords such that the more frequently occurring sequences of values of digital signals are represented by relatively short codewords and the less frequently occurring sequences of values of digital signals are represented by relatively long codewords, the method comprising:
forming a codeword for each event of a set of events, each event being a run of none of more signals having the most common amplitude followed by a signal having an amplitude other than the most common amplitude, and
providing with the codewords information indicative of the sign of any amplitude other than the most common amplitude in the events,
such that relatively short codewords are formed to represent events that are relatively more likely to occur, and relatively long codewords are formed to represent events that are relatively less likely to occur,
wherein the information indicative of the sign includes an encoding of the sequence of signs of all the signals having other than the most common value to produce a separate sign codeword for all the signs.

21. A method of image compression comprising:
dividing an image into blocks;
for each block
transforming the block to form transform coefficients for the block;
quantizing the transform coefficients of the block;
ordering the quantized coefficients of the block along a two-dimensional path to form a series of quantized transform coefficients;
forming events from the series of quantized transform coefficients, each event being a run of none or more zero-valued coefficients followed by a run of one of a predefined set of sequences, each sequence in the set being either a single coefficient of amplitude greater than one, or a sequence of 1's and 0's starting with a coefficient of amplitude 1;

forming a codeword for each formed event,
providing with the codewords information indicative of the sign of any non-zero amplitude in the events,
such that relatively short codewords are formed to represent events that are relatively more likely to occur, and relatively long codewords are formed to represent events that are relatively less likely to occur.

22. A method as recited in claim 21, wherein the providing of information indicative of the sign includes:
including sign information of a first kind for those events are each a run of none of more zero-amplitude coefficients followed by a single coefficient having an amplitude greater than 1, the sign information of the first kind to indicate for an event the sign of the non-zero amplitude, and
including sign information of a second kind for those events that are each a run of none of more zero-amplitude coefficients followed by a run of one or more identical sequences of one or more coefficients each having amplitude of 0 or 1 starting with an amplitude of 0.

23. A method as recited in claim 22, wherein the sign information of the first kind is in the form a sign bit for the codewords to indicate the sign of the non-zero amplitude.

24. A method as recited in claim 22, wherein the sign information of the first kind includes information related to change of sign.

25. A method as recited in claim 24, wherein in the sign information of the first kind, a predefined initial sign is assumed for the first non-zero amplitude coefficient having amplitude other than the most common amplitude.

26. A method as recited in claim 24, wherein in the sign information of the first kind, an indication is included of sign of the first coefficient having amplitude other than the most common amplitude.

27. A method as recited in claim 22,
wherein positive coefficient values are distinguished from negative coefficient values in events that include a run of zero or more zero-amplitude coefficients followed by a run of one or more identical sequences of one or more coefficients each having an amplitude of 0 or 1 starting with amplitude 1, such that sign information of the second kind is applicable to events in which positive coefficient values are distinguished from negative coefficient values, such that the forming of codewords is for events in which positive coefficient values are distinguished from negative coefficient values, and such that the sign information of the second kind is included in the formed codewords.

28. A method as recited in claim 21, wherein the indication of the sign includes an encoding of the sequence of signs of all the non-zero coefficients to produce a separate sign codeword for all the signs.

29. A method as defined in claim 21, wherein an event is a run of none or more zero-valued coefficients followed by a run of one or more non-zero-amplitude coefficients.

30. A method as recited in claim 29, wherein the events include runs of none or more zero-valued coefficients followed by a subset of all possible runlengths of non-zero-amplitude coefficients.

31. A method as recited in claim 30, wherein the subset includes no runs of length 2 or more of coefficients of amplitude 3 or more.

32. A method as recited in claim 21, wherein a table is provided for storing a plurality of codewords for a set of events, the table organized such that the more likely-to-occur events have shorter codewords than the less likely-to-occur events, and wherein the step of forming a codeword for each formed event includes looking up the table.

33. A method as recited in claim 21, further comprising the step of:
forming fixed length codewords for at least some of the events.

34. A method as recited in claim 21, further comprising:
forming an indication for when all the remaining coefficients in the series have amplitude 0.

35. A method as recited in claim 21, wherein forming an event further includes indicating whether or not the event is the last for the series such that all the remaining coefficients in the series after the event have amplitude 0.

36. An apparatus to encode a series of quantized coefficients of a transform of a block of image data, the transform such that 0 is the most likely coefficient amplitude and 1 is the next most likely coefficient amplitude, the apparatus comprising:
means for forming events from the series of quantized transform coefficients, each event being a run of none or more zero-valued coefficients followed by a run of one of a predefined set of sequences, each sequence in the set being either a single coefficient of amplitude greater than one, or a sequence of 1's and 0's starting with a coefficient of amplitude 1;
means for forming a codeword for each formed event,
means for providing with the codewords information indicative of the sign of any non-zero amplitude in the events,
such that relatively short codewords are formed to represent events that are relatively more likely to occur, and relatively long codewords are formed to represent events that are relatively less likely to occur.

37. An apparatus as recited in claim 36, wherein the means for providing information indicative of the sign includes:
means for including sign information of a first kind for those events are each a run of none of more zero-amplitude coefficients followed by a single coefficient having an amplitude greater than 1, the sign information of the first kind to indicate for an event the sign of the non-zero amplitude, and
means for including sign information of a second kind for those events that are each a run of none of more zero-amplitude coefficients followed by a run of one or more identical sequences of one or more coefficients each having amplitude of 0 or 1 starting with an amplitude of 0.

38. An apparatus as recited in claim 37, wherein the sign information of the first kind is in the form a sign bit for the codewords to indicate the sign of the non-zero amplitude.

39. An apparatus as recited in claim 37, wherein the sign information of the first kind includes information related to change of sign.

40. An apparatus as recited in claim 39, wherein in the sign information of the first kind, a predefined initial sign is assumed for the first non-zero amplitude coefficient having amplitude other than the most common amplitude.

41. An apparatus as recited in claim 39, wherein in the sign information of the first kind, an indication is included of sign of the first coefficient having amplitude other than the most common amplitude.

42. An apparatus as recited in claim 37,
wherein positive coefficient values are distinguished from negative coefficient values in events that include a run of zero or more zero-amplitude coefficients followed by a run of one or more identical sequences of one or more coefficients each having an amplitude of 0 or 1 starting with amplitude 1, such that sign information of the second kind is applicable to events in which positive coefficient values are distinguished from negative coefficient values, such that the forming of codewords is for events in which positive coefficient values are distinguished from negative coefficient values, and such that the sign information of the second kind is included in the formed codewords.

43. An apparatus as recited in claim 36, wherein the indication of the sign includes an encoding of the sequence of signs of all the non-zero coefficients to produce a separate sign codeword for all the signs.

44. An apparatus as defined in claim 36, wherein each event is a run of none or more zero-valued coefficients followed by one of a predefined set of sequences, each sequence in the set being either a single coefficient of amplitude greater than one, or a sequence of 1's and 0's starting with a coefficient of amplitude 1.

45. An apparatus as defined in claim 36, wherein an event is a run of none or more zero-valued coefficients followed by a run of one or more non-zero-amplitude coefficients.

46. An apparatus to encode a series of quantized coefficients comprising:
an event recognizer to recognize an event of a set of events, an event being a run of none or more zero-valued coefficients, followed by a run of one or more of a predefined set of sequences, each sequence in the set of sequences being either a single coefficient of amplitude greater than one, or a sequence of 1's and 0's starting with a coefficient of amplitude 1 of followed by any non-zero coefficient, for each event, the recognizer determining the runlength of the run of none or more zero-valued coefficients, recognizing the sequence of the predefined set of sequences, and determining the runlength of the recognized sequence in the case that the run of none or more zero-valued coefficients is followed by a run of one or more of the sequences of the predefined set of sequences; and
an encoder coupled to the event recognizer, the encoder accepting the runlengths of 0's, the recognized sequence, and the runlength of the recognized sequence, the encoder to form a codeword for the event, the encoder further providing with the codewords information indicative of the sign of any non-zero amplitude in the events,
such that the apparatus forms relatively short codewords to represent combinations that are relatively more likely to occur, and relatively long to represent combinations that are relatively less likely to occur.

47. An apparatus as recited in claim 46, wherein the information indicative of the sign includes:
sign information of a first kind for those events are each a run of none of more zero-amplitude coefficients followed by a single coefficient having an amplitude greater than 1, the sign information of the first kind to indicate for an event the sign of the non-zero amplitude, and
sign information of a second kind for those events that are each a run of none of more zero-amplitude coefficients followed by a run of one or more identical sequences of one or more coefficients each having amplitude of 0 or 1 starting with an amplitude of 0.

48. An apparatus as recited in claim 47, wherein the sign information of the first kind is in the form a sign bit for the codewords to indicate the sign of the non-zero amplitude.

49. An apparatus as recited in claim 47, wherein the sign information of the first kind includes information related to change of sign.

50. An apparatus as recited in claim 49, wherein in the sign information of the first kind, a predefined initial sign is assumed for the first non-zero coefficient having amplitude other than the most common amplitude.

51. An apparatus as recited in claim 49, wherein in the sign information of the first kind, an indication is included of sign of the first coefficient having amplitude other than the most common amplitude.

52. An apparatus as recited in claim 47,
wherein positive coefficient values are distinguished from negative coefficient values in events that include a run of zero or more zero-amplitude coefficients followed by a run of one or more identical sequences of one or more coefficients each having an amplitude of 0 or 1 starting with amplitude 1, such that sign information of the second kind is applicable to events in which positive coefficient values are distinguished from negative coefficient values, such that the forming of codewords is for events in which positive coefficient values are distinguished from negative coefficient values, and such that the sign information of the second kind is included in the formed codewords.

53. An apparatus as recited in claim 46, wherein the indication of the sign includes an encoding of the sequence of signs of all the non-zero coefficients to produce a separate sign codeword for all the signs.

* * * * *

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

Col. 7, Change Table 3-4 from

"

Table 3-4: Statistics of repeated coefficient patterns ending with runs of 4's

| Run of 4's | Runlength of zero valued coefficients | | | | | |
|---|---|---|---|---|---|---|
| | 0 | 1 | 2 | 3 | 4 | ... |
| 4 | S4-1-0 | S4-1-1 | S4-1-2 | S4-1-3 | S4-1-4 | ... |
| 44 | S4-1-0 | S4-2-1 | S4-2-2 | S4-2-3 | S4-2-4 | ... |
| 444 | S4-3-0 | S4-3-1 | S4-3-2 | S4-3-3 | S4-3-4 | ... |
| ... | ... | ... | ... | ... | ... | ... |

"

to

--

Table 3-4: Statistics of repeated coefficient patterns ending with runs of 4's

| Run of 4's | Runlength of zero valued coefficients | | | | | |
|---|---|---|---|---|---|---|
| | 0 | 1 | 2 | 3 | 4 | ... |
| 4 | S4-1-0 | S4-1-1 | S4-1-2 | S4-1-3 | S4-1-4 | ... |
| 44 | S4-2-0 | S4-2-1 | S4-2-2 | S4-2-3 | S4-2-4 | ... |
| 444 | S4-3-0 | S4-3-1 | S4-3-2 | S4-3-3 | S4-3-4 | ... |
| ... | ... | ... | ... | ... | ... | ... |

--

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

Col. 11, Change Table 6 from

"
Table 6: Statistics for coeff. ampl. patterns preceded by zero coeff. amplitudes

| Coeff. Ampl. Pattern | Runlength of zero valued coefficients | | | | |
|---|---|---|---|---|---|
| | 0 | 1 | 2 | 3 | ... |
| 1 | S1-1-0 | S1-1-1 | S1-1-2 | S1-1-3 | ... |
| 11 | S1-3-0 | S1-3-1 | S1-3-2 | S1-3-3 | ... |
| 111 | S1-3-0 | S1-3-1 | S1-3-2 | S1-3-3 | ... |
| ... | ... | ... | ... | ... | ... |
| 101 | S101-1-0 | S101-1-1 | S101-1-2 | S101-1-3 | ... |
| 1001 | S1001-1-0 | S1001-1-1 | S1001-1-2 | S1001-1-3 | ... |
| 1101 | S1101-1-0 | S1101-1-1 | S1101-1-2 | S1101-1-3 | ... |
| 1011 | S1011-1-0 | S1011-1-1 | S1011-1-2 | S1011-1-3 | ... |
| 10001 | S10001-1-0 | S10001-1-1 | S10001-1-2 | S10001-1-3 | ... |
| 11001 | S11001-1-0 | S11001-1-1 | S11001-1-2 | S11001-1-3 | ... |
| 10101 | S10101-1-0 | S10101-1-1 | S10101-1-2 | S10101-1-3 | ... |
| 10011 | S10011-1-0 | S10011-1-1 | S10011-1-2 | S10011-1-3 | ... |
| 11101 | S11101-1-0 | S11101-1-1 | S11101-1-2 | S11101-1-3 | ... |
| 10111 | S10111-1-0 | S10111-1-1 | S10111-1-2 | S10111-1-3 | ... |
| 101101 | S101-2-0 | S101-2-1 | S101-2-2 | S101-2-3 | ... |
| ... | ... | ... | ... | ... | ... |
| 2 | S2-1-0 | S2-1-1 | S2-1-2 | S2-1-3 | ... |
| 22 | S22-2-0 | S22-2-1 | S22-2-2 | S22-2-3 | ... |
| 222 | S222-3-0 | S222-3-1 | S222-3-2 | S222-3-3 | ... |
| ... | ... | ... | ... | ... | ... |
| 3 | S3-1-0 | S3-1-1 | S3-3-2 | S3-1-3 | ... |
| 33 | S33-2-0 | S33-2-1 | S33-3-2 | S33-3-3 | ... |
| 333 | S333-3-0 | S333-3-1 | S333-3-2 | S333-3-3 | ... |
| ... | ... | ... | ... | ... | ... |
| 4 | S4-1-0 | S4-1-1 | S4-1-2 | S4-1-3 | ... |
| 44 | S44-1-0 | S44-2-1 | S44-2-2 | S44-2-3 | ... |
| 444 | S444-3-0 | S444-3-1 | S444-3-2 | S444-3-3 | ... |
| ... | ... | ... | ... | ... | ... |

"

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

Col. 11, Change Table 6 from (cont'd)

to --

Table 6: Statistics for coeff. ampl. patterns preceded by zero coeff. amplitudes

| Coeff. Ampl. Pattern | Runlength of zero valued coefficients | | | | |
|---|---|---|---|---|---|
| | 0 | 1 | 2 | 3 | ... |
| 1 | S1-1-0 | S1-1-1 | S1-1-2 | S1-1-3 | ... |
| 11 | S1-2-0 | S1-2-1 | S1-2-2 | S1-2-3 | ... |
| 111 | S1-3-0 | S1-3-1 | S1-3-2 | S1-3-3 | ... |
| ... | ... | ... | ... | ... | ... |
| 101 | S101-1-0 | S101-1-1 | S101-1-2 | S101-1-3 | ... |
| 1001 | S1001-1-0 | S1001-1-1 | S1001-1-2 | S1001-1-3 | ... |
| 1101 | S1101-1-0 | S1101-1-1 | S1101-1-2 | S1101-1-3 | ... |
| 1011 | S1011-1-0 | S1011-1-1 | S1011-1-2 | S1011-1-3 | ... |
| 10001 | S10001-1-0 | S10001-1-1 | S10001-1-2 | S10001-1-3 | ... |
| 11001 | S11001-1-0 | S11001-1-1 | S11001-1-2 | S11001-1-3 | ... |
| 10101 | S10101-1-0 | S10101-1-1 | S10101-1-2 | S10101-1-3 | ... |
| 10011 | S10011-1-0 | S10011-1-1 | S10011-1-2 | S10011-1-3 | ... |
| 11101 | S11101-1-0 | S11101-1-1 | S11101-1-2 | S11101-1-3 | ... |
| 10111 | S10111-1-0 | S10111-1-1 | S10111-1-2 | S10111-1-3 | ... |
| 101101 | S101-2-0 | S101-2-1 | S101-2-2 | S101-2-3 | ... |
| ... | ... | ... | ... | ... | ... |
| 2 | S2-1-0 | S2-1-1 | S2-1-2 | S2-1-3 | ... |
| 22 | S2-2-0 | S2-2-1 | S2-2-2 | S2-2-3 | ... |
| 222 | S2-3-0 | S2-3-1 | S2-3-2 | S2-3-3 | ... |
| ... | ... | ... | ... | ... | ... |
| 3 | S3-1-0 | S3-1-1 | S3-1-2 | S3-1-3 | ... |
| 33 | S3-2-0 | S3-2-1 | S3-2-2 | S3-2-3 | ... |
| 333 | S3-3-0 | S3-3-1 | S3-3-2 | S3-3-3 | ... |
| ... | ... | ... | ... | ... | ... |
| 4 | S4-1-0 | S4-1-1 | S4-1-2 | S4-1-3 | ... |
| 44 | S4-2-0 | S4-2-1 | S4-2-2 | S4-2-3 | ... |
| 444 | S4-3-0 | S4-3-1 | S4-3-2 | S4-3-3 | ... |
| ... | ... | ... | ... | ... | ... |

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

Columns 11-12 kindly change Table 7 from:

"
| Coeff. Ampl. Pattern | Table 7: VLC for coeff. ampl. patterns preceded by zeroes ||||| |
|---|---|---|---|---|---|
| | Runlength of zero valued coefficients |||| |
| | 0 | 1 | 2 | 3 | ... |
| 1 | C1-1-0 | C1-1-1 | C1-1-2 | C1-1-3 | ... |
| 11 | C1-2-0 | C1-2-1 | C1-2-2 | C1-2-3 | ... |
| 111 | C1-3-0 | C1-3-1 | C1-3-2 | C1-3-3 | ... |
| ... | ... | ... | ... | ... | ... |
| 101 | C101-1-0 | C1-1-1 | C1-1-2 | C1-1-3 | ... |
| 1001 | C1001-1-0 | C1001-1-1 | C1001-1-2 | C1001-1-3 | ... |
| 1101 | C1101-1-0 | C1101-1-1 | C1101-1-2 | C1101-1-3 | ... |
| 1011 | C1011-1-0 | C1011-1-1 | C1011-1-2 | C1011-1-3 | ... |
| 10001 | C10001-1-0 | C10001-1-1 | C10001-1-2 | C10001-1-3 | ... |
| 11001 | C11001-1-0 | C11001-1-1 | C11001-1-2 | C11001-1-3 | ... |
| 10101 | C10101-1-0 | C10101-1-1 | C10101-1-2 | C10101-1-3 | ... |
| 10011 | C10011-3-0 | C10011-1-1 | C10011-1-2 | C10011-1-3 | ... |
| 11101 | C11101-1-0 | C11101-1-1 | C11101-1-2 | C11101-1-3 | ... |
| 10111 | C10111-1-0 | C10111-1-1 | C10111-1-2 | C10111-1-3 | ... |
| 101101 | C101-2-0 | C101-2-1 | C101-2-2 | C101-2-3 | ... |
| ... | ... | ... | ... | ... | ... |
| 2 | C2-1-0 | C2-1-1 | C2-1-2 | C2-1-3 | ... |
| 22 | C22-2-0 | C22-2-1 | C22-2-2 | C22-2-3 | ... |
| 222 | C222-3-0 | C222-3-1 | C222-3-2 | C222-3-3 | ... |
| ... | ... | ... | ... | ... | ... |
| 3 | C3-1-0 | C3-1-1 | C3-3-2 | C3-1-3 | ... |
| 33 | C33-2-0 | C33-2-1 | C33-3-2 | C33-3-3 | ... |
| 333 | C333-3-0 | C333-3-1 | C333-3-2 | C333-3-3 | ... |
| ... | ... | ... | ... | ... | ... |
| 4 | C4-1-0 | C4-1-1 | C4-1-2 | C4-1-3 | ... |
| 44 | C44-1-0 | C44-2-1 | C44-2-2 | C44-2-3 | ... |
| 444 | C444-3-0 | C444-3-1 | C444-3-2 | C444-3-3 | ... |
| ... | ... | ... | ... | ... | ... |
"

UNITED STATES PATENT AND TRADEMARK OFFICE
CERTIFICATE OF CORRECTION

PATENT NO.       : 7,203,372 B1
APPLICATION NO.  : 10/440595
DATED            : April 10, 2007
INVENTOR(S)      : Chen et al.

It is certified that error appears in the above-identified patent and that said Letters Patent is hereby corrected as shown below:

Columns 11-12 kindly change Table 7 from (cont'd):

to
--

| Table 7: VLC for coeff. ampl. patterns preceded by zeroes | | | | | |
|---|---|---|---|---|---|
| Coeff. Ampl. Pattern | Runlength of zero valued coefficients | | | | |
|  | 0 | 1 | 2 | 3 | ... |
| 1 | C1-1-0 | C1-1-1 | C1-1-2 | C1-1-3 | ... |
| 11 | C1-2-0 | C1-2-1 | C1-2-2 | C1-2-3 | ... |
| 111 | C1-3-0 | C1-3-1 | C1-3-2 | C1-3-3 | ... |
| ... | ... | ... | ... | ... | ... |
| 101 | C101-1-0 | C1-1-1 | C1-1-2 | C1-1-3 | ... |
| 1001 | C1001-1-0 | C1001-1-1 | C1001-1-2 | C1001-1-3 | ... |
| 1101 | C1101-1-0 | C1101-1-1 | C1101-1-2 | C1101-1-3 | ... |
| 1011 | C1011-1-0 | C1011-1-1 | C1011-1-2 | C1011-1-3 | ... |
| 10001 | C10001-1-0 | C10001-1-1 | C10001-1-2 | C10001-1-3 | ... |
| 11001 | C11001-1-0 | C11001-1-1 | C11001-1-2 | C11001-1-3 | ... |
| 10101 | C10101-1-0 | C10101-1-1 | C10101-1-2 | C10101-1-3 | ... |
| 10011 | C10011-1-0 | C10011-1-1 | C10011-1-2 | C10011-1-3 | ... |
| 11101 | C11101-1-0 | C11101-1-1 | C11101-1-2 | C11101-1-3 | ... |
| 10111 | C10111-1-0 | C10111-1-1 | C10111-1-2 | C10111-1-3 | ... |
| 101101 | C101-2-0 | C101-2-1 | C101-2-2 | C101-2-3 | ... |
| ... | ... | ... | ... | ... | ... |
| 2 | C2-1-0 | C2-1-1 | C2-1-2 | C2-1-3 | ... |
| 22 | C2-2-0 | C2-2-1 | C2-2-2 | C2-2-3 | ... |
| 222 | C2-3-0 | C2-3-1 | C2-3-2 | C2-3-3 | ... |
| ... | ... | ... | ... | ... | ... |
| 3 | C3-1-0 | C3-1-1 | C3-1-2 | C3-1-3 | ... |
| 33 | C3-2-0 | C3-2-1 | C3-2-2 | C3-2-3 | ... |
| 333 | C3-3-0 | C3-3-1 | C3-3-2 | C3-3-3 | ... |
| ... | ... | ... | ... | ... | ... |
| 4 | C4-1-0 | C4-1-1 | C4-1-2 | C4-1-3 | ... |
| 44 | C4-2-0 | C4-2-1 | C4-2-2 | C4-2-3 | ... |
| 444 | C4-3-0 | C4-3-1 | C4-3-2 | C4-3-3 | ... |
| ... | ... | ... | ... | ... | ... |

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

In Column 13, kindly change Table 8 from:

"

Table 8: VLC for coeff. ampl. patterns preceded by zeroes

| Coeff. Ampl. Pattern | Runlength of zero valued coefficients | | | | |
|---|---|---|---|---|---|
| | 0 | 1 | 2 | 3 | ... |
| 1 | $C_1\text{-}0$ | $C_1\text{-}1$ | $C_1\text{-}2$ | $C_1\text{-}3$ | ... |
| 11 | $C_{11}\text{-}0$ | $C_{11}\text{-}1$ | $C_{11}\text{-}2$ | $C_{11}\text{-}3$ | ... |
| 111 | $C_{111}\text{-}0$ | $C_{111}\text{-}1$ | $C_{111}\text{-}2$ | $C_{111}\text{-}3$ | ... |
| ... | ... | ... | ... | ... | ... |
| 101 | $C_{101}\text{-}0$ | $C_1\text{-}1$ | $C_1\text{-}2$ | $C_1\text{-}3$ | ... |
| 1001 | $C_{1001}\text{-}0$ | $C_{1001}\text{-}1$ | $C_{1001}\text{-}2$ | $C_{1001}\text{-}3$ | ... |
| 1101 | $C_{1101}\text{-}0$ | $C_{1101}\text{-}1$ | $C_{1101}\text{-}2$ | $C_{1101}\text{-}3$ | ... |
| 1011 | $C_{1011}\text{-}0$ | $C_{1011}\text{-}1$ | $C_{1011}\text{-}2$ | $C_{1011}\text{-}3$ | ... |
| 10001 | $C_{10001}\text{-}0$ | $C_{10001}\text{-}1$ | $C_{10001}\text{-}2$ | $C_{10001}\text{-}3$ | ... |
| 11001 | $C_{11001}\text{-}0$ | $C_{11001}\text{-}1$ | $C_{11001}\text{-}2$ | $C_{11001}\text{-}3$ | ... |
| 10101 | $C_{10101}\text{-}0$ | $C_{10101}\text{-}1$ | $C_{10101}\text{-}2$ | $C_{10101}\text{-}3$ | ... |
| 10011 | $C_{10011}\text{-}0$ | $C_{10011}\text{-}1$ | $C_{10011}\text{-}2$ | $C_{10011}\text{-}3$ | ... |
| 11101 | $C_{11101}\text{-}0$ | $C_{11101}\text{-}1$ | $C_{11101}\text{-}2$ | $C_{11101}\text{-}3$ | ... |
| 10111 | $C_{10111}\text{-}0$ | $C_{10111}\text{-}1$ | $C_{10111}\text{-}2$ | $C_{10111}\text{-}3$ | ... |
| ... | ... | ... | ... | ... | ... |
| 2 | $C_2\text{-}0$ | $C_2\text{-}1$ | $C_2\text{-}2$ | $C_2\text{-}3$ | ... |
| 3 | $C_3\text{-}0$ | $C_3\text{-}1$ | $C_3\text{-}2$ | $C_3\text{-}3$ | ... |
| 4 | $C_4\text{-}0$ | $C_4\text{-}1$ | $C_4\text{-}2$ | $C_4\text{-}3$ | ... |
| ... | ... | ... | ... | ... | ... |

"

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

In Column 13, kindly change Table 8 from (cont'd):

to

-- Table 8: VLC for coeff. ampl. patterns precoded by zeroes --

| Coeff. Ampl. Pattern | Runlength of zero valued coefficients ||||| 
| | 0 | 1 | 2 | 3 | ... |
|---|---|---|---|---|---|
| 1 | $C_1$-0 | $C_1$-1 | $C_1$-2 | $C_1$-3 | ... |
| 11 | $C_{11}$-0 | $C_{11}$-1 | $C_{11}$-2 | $C_{11}$-3 | ... |
| 111 | $C_{111}$-0 | $C_{111}$-1 | $C_{111}$-2 | $C_{111}$-3 | ... |
| ... | ... | ... | ... | ... | ... |
| 101 | $C_{101}$-0 | $C_{101}$-1 | $C_{101}$-2 | $C_{101}$-3 | ... |
| 1001 | $C_{1001}$-0 | $C_{1001}$-1 | $C_{1001}$-2 | $C_{1001}$-3 | ... |
| 1101 | $C_{1101}$-0 | $C_{1101}$-1 | $C_{1101}$-2 | $C_{1101}$-3 | ... |
| 1011 | $C_{1011}$-0 | $C_{1011}$-1 | $C_{1011}$-2 | $C_{1011}$-3 | ... |
| 10001 | $C_{10001}$-0 | $C_{10001}$-1 | $C_{10001}$-2 | $C_{10001}$-3 | ... |
| 11001 | $C_{11001}$-0 | $C_{11001}$-1 | $C_{11001}$-2 | $C_{11001}$-3 | ... |
| 10101 | $C_{10101}$-0 | $C_{10101}$-1 | $C_{10101}$-2 | $C_{10101}$-3 | ... |
| 10011 | $C_{10011}$-0 | $C_{10011}$-1 | $C_{10011}$-2 | $C_{10011}$-3 | ... |
| 11101 | $C_{11101}$-0 | $C_{11101}$-1 | $C_{11101}$-2 | $C_{11101}$-3 | ... |
| 10111 | $C_{10111}$-0 | $C_{10111}$-1 | $C_{10111}$-2 | $C_{10111}$-3 | ... |
| ... | ... | ... | ... | ... | ... |
| 2 | $C_2$-0 | $C_2$-1 | $C_2$-2 | $C_2$-3 | ... |
| 3 | $C_3$-0 | $C_3$-1 | $C_3$-2 | $C_3$-3 | ... |
| 4 | $C_4$-0 | $C_4$-1 | $C_4$-2 | $C_4$-3 | ... |
| ... | ... | ... | ... | ... | ... |

UNITED STATES PATENT AND TRADEMARK OFFICE
CERTIFICATE OF CORRECTION

PATENT NO. : 7,203,372 B1
APPLICATION NO. : 10/440595
DATED : April 10, 2007
INVENTOR(S) : Chen et al.

It is certified that error appears in the above-identified patent and that said Letters Patent is hereby corrected as shown below:

In column 15, line 27, kindly change "$C_{11}\, s_c\, C_{10}\, s_c\, C_{10}\, s_c\, C_{11}\, C_{12}$ EOB." to --$C_{11}\, s_c\, C_{10}\, s_c\, C_{31}\, s_c\, C_{10}\, s_c\, C_{11}\, C_{12}$ EOB.--.

In column 16, line 57, kindly change "0 1 –1 0 3 – 1 0 1 0 0 0 0 0 0 0." to --0 1 –1 0 3 –1 0 1 0 0 1 0 0 0 0 0.--.

Signed and Sealed this

Third Day of July, 2007

JON W. DUDAS
*Director of the United States Patent and Trademark Office*